(12) United States Patent
Chen et al.

(10) Patent No.: US 12,225,416 B2
(45) Date of Patent: Feb. 11, 2025

(54) COMMUNICATION METHOD AND APPARATUS

(71) Applicant: Huawei Technologies Co., Ltd., Shenzhen (CN)

(72) Inventors: Lei Chen, Beijing (CN); Bingzhao Li, Beijing (CN); Xun Tang, Shenzhen (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 17/652,540

(22) Filed: Feb. 25, 2022

(65) Prior Publication Data

US 2022/0182892 A1 Jun. 9, 2022

Related U.S. Application Data

(63) Continuation of application No. PCT/CN2019/103840, filed on Aug. 30, 2019.

(51) Int. Cl.
*H04W 36/00* (2009.01)
*H04W 36/08* (2009.01)
*H04W 36/32* (2009.01)
*H04W 36/36* (2009.01)

(52) U.S. Cl.
CPC ....... *H04W 36/0016* (2013.01); *H04W 36/08* (2013.01); *H04W 36/324* (2023.05); *H04W 36/0085* (2018.08); *H04W 36/36* (2013.01)

(58) Field of Classification Search
None
See application file for complete search history.

(56) References Cited

U.S. PATENT DOCUMENTS

| | | | |
|---|---|---|---|
| 2014/0198768 A1 | 7/2014 | Hahn et al. | |
| 2021/0306927 A1* | 9/2021 | Wei | H04W 36/324 |
| 2021/0377832 A1* | 12/2021 | Wang | H04W 36/0058 |
| 2022/0078684 A1* | 3/2022 | Fehrenbach | H04W 36/362 |

FOREIGN PATENT DOCUMENTS

| | | |
|---|---|---|
| CN | 105580427 A | 5/2016 |
| CN | 107113673 A | 8/2017 |
| CN | 108366365 A | 8/2018 |
| CN | 108632926 A | 10/2018 |
| CN | 108882316 A | 11/2018 |
| CN | 110546991 A | 12/2019 |
| IN | 108810960 A | 11/2018 |
| WO | 2008014721 A1 | 2/2008 |

(Continued)

OTHER PUBLICATIONS

Huawei et al., "Considerations on mobility management in NTN", 3GPP TSG-RAN WG2 Meeting #105, R2-1901201, Athens, Greece, Feb. 25-Mar. 1, 2019, 6 pages.

(Continued)

*Primary Examiner* — German Viana Di Prisco
(74) *Attorney, Agent, or Firm* — Slater Matsil, LLP

(57) ABSTRACT

A first network device determines a first cell. The first network device sends a first message, where the first message includes an identifier of the first cell, and the identifier of the first cell is used to indicate a terminal device to perform cell reestablishment.

20 Claims, 10 Drawing Sheets

(56) References Cited

FOREIGN PATENT DOCUMENTS

WO   2018156696 A1   8/2018

OTHER PUBLICATIONS

Interdigital Inc., (Email discussion rapporteur), "Report of Email Discussion [106# 73][NR/NTN] Mobility issues and solutions", 3GPP RAN WG2 Meeting #107, R2-1910961, Prague, Czech Republic, Aug. 26-30, 2019, 50 pages.

Interdigital Inc., "Conditional Mobility for Non-Terrestrial Networks", 3GPP RAN WG2 Meeting #106, R2-1907840, Reno, NV, US, May 13-17, 2019, 6 pages.

Ericsson (Email discussion rapporteur), "Report of email discussion [104#54] [NR-NTN]", 3GPP TSG-RAN WG2 Meeting #104, Tdoc R2-1900547, Athens, Greece, Feb. 25-Mar. 1, 2019, 18 pages.

Ericsson, "Connected mode mobility aspects for NTN GEO", 3GPP TSG-RAN WG2 #106, R2-1907158, Reno, Nevada, US, May 13-17, 2019, 7 pages.

* cited by examiner

COMMUNICATION METHOD AND APPARATUS

CROSS-REFERENCE TO RELATED APPLICATIONS

This application is a continuation of International Application No. PCT/CN2019/103840, filed on Aug. 30, 2019, the disclosure of which is hereby incorporated by reference in its entirety.

TECHNICAL FIELD

This application relates to the field of mobile communication technologies, and in particular, to a communication method and apparatus.

BACKGROUND

A terminal device may be handed over from a source cell to a target cell due to movement of the terminal device. In a cell handover process, a source base station may send a measurement configuration message to the terminal device. After receiving the measurement configuration message, the terminal device measures a neighboring cell to obtain a measurement report, and sends the measurement report to the source base station. The source base station may determine, based on the measurement report, whether the terminal device is to perform cell handover. If the base station determines that the terminal device needs to perform cell handover, the base station sends a handover command to the terminal device, to trigger the terminal device to perform cell handover.

In a 5th generation mobile communication technology (5G) system, a non-terrestrial network (NTN) is introduced. In the NTN, a base station or some functions of a base station is/are deployed on a high-altitude platform or a satellite to provide seamless coverage for a terminal device. Because the satellite moves around the earth, the terminal device moves relative to the satellite. Consequently, the terminal device that is using a network service may move from a coverage area (a source cell) of a satellite to a coverage area (a target cell) of another satellite. To ensure continuity of communication and quality of service, the terminal device needs to perform cell handover.

However, because the satellite moves fast, when a base station determines that the terminal device can perform cell handover, the terminal device may not be located within a coverage area of the base station. If the base station sends a handover command to the terminal device at this moment, the terminal device may not receive the handover command, and consequently the terminal device cannot be handed over to a cell in time. Therefore, a radio link failure is triggered, and data transmission performance of the terminal device is affected.

SUMMARY

This application provides a communication method and apparatus, so that a terminal device may perform cell handover in time, to ensure continuity of communication of the terminal device as much as possible.

According to a first aspect, a communication method is provided. The method includes: A first network device determines a first cell. The first network device sends a first message, where the first message includes an identifier of the first cell, and the identifier of the first cell is used to indicate a terminal device to perform cell reestablishment.

The method may be performed by a first communication apparatus, where the first communication apparatus may be a communication device or a communication apparatus, for example, a chip system, that can support the communication device to implement a function required in the method. For example, the communication device is a network device.

In the embodiments of this application, the first network device may determine a cell, for example, the first cell, in which the terminal device needs to perform reestablishment, and then the first network device may send a message including the identifier of the first cell to the terminal device, to notify the terminal device to perform reestablishment in the first cell. This may be understood as: The first network device may indicate the terminal device to perform, in advance, reestablishment in the first cell, so that the terminal device performs cell reestablishment without waiting for a radio link failure to occur on the terminal device, thereby reducing a data transmission interruption time period of the terminal device as much as possible.

In a possible implementation, the first message is sent in a broadcast manner.

In this embodiment of this application, the first network device may broadcast the first message. In this way, for a plurality of terminal devices, the first message does not need to be individually sent to each terminal device, thereby reducing system overheads.

In a possible implementation, the first message further includes a first condition, where the first condition is used to indicate the terminal device to perform cell reestablishment when the first condition is met, where the first condition includes one or any combination of the following: the first message is received by the terminal device; the terminal device is located in a first location; or a reference signal received power of the first cell is greater than a first threshold.

In this embodiment of this application, the first message may include the first condition. To be specific, the terminal device is indicated to perform cell reestablishment only when the first condition is met, in other words, the terminal device performs cell reestablishment in the first cell at an appropriate moment, to reduce, as much as possible, a possibility of a cell reestablishment failure or a long data transmission interruption time period caused by premature or delayed cell reestablishment. The first condition may be: The first message is received by the terminal device, to be specific, the terminal device performs cell reestablishment upon receiving the first message, to avoid, as much as possible, performing cell reestablishment again due to a cell handover failure. Alternatively, the first condition may be: The terminal device is located in the first location, for example, a cell edge, to be specific, the terminal device performs cell reestablishment only when reaching the cell edge, to avoid unnecessary cell reestablishment. Alternatively, the first condition may be: The reference signal received power of the first cell is greater than the first threshold, to be specific, the cell reestablishment is performed only when the reference signal received power that is of the first cell and that is measured by the terminal device is high, to ensure as much as possible that communication quality is high after the cell reestablishment is performed.

In a possible implementation, the method further includes the following.

The first network device receives a reestablishment request message from the terminal device, where the reestablishment request message is used to request to perform cell reestablishment of the terminal device in the first cell.

The reestablishment request message includes a cause value, where the cause value is used to indicate that the cell reestablishment to be performed in the first cell is to be performed based on the first message.

In this embodiment of this application, the cause value included in the reestablishment request message that is sent by the terminal device to the first network device may indicate that the cell reestablishment is to be performed based on the first message. This may be understood as: A reason why the cell reestablishment is performed is the same as a reason why the first network device sends the first message. Therefore, the first network device may determine a reason why the terminal device requests the cell reestablishment, and send, based on the cause value, a radio resource control reconfiguration message to the terminal device, to ensure correctness of the radio resource control reconfiguration message, thereby improving connection efficiency.

In a possible implementation, the method further includes the following.

The first network device sends context information of the terminal device to a second network device, where the context information is used by the second network device to establish a connection to the terminal device, and the first cell is a cell served by the second network device.

In this embodiment of this application, considering that the first cell may be the cell served by the second network device, the first network device may notify the second network device of the context information of the terminal device, to ensure a success rate of the cell reestablishment as much as possible.

According to a second aspect, a communication method is provided. The communication method includes: receiving a first message from a first network device, where the first message carries an identifier of a first cell; and sending a reestablishment request message in the first cell based on the identifier of the first cell.

The method may be performed by a second communication apparatus, where the second communication apparatus may be a communication device or a communication apparatus, for example, a chip system, that can support the communication device to implement a function required in the method. For example, the communication device is a terminal device.

In a possible implementation, the first message includes a first condition used to indicate the communication apparatus to send the reestablishment request message in the first cell when the first condition is met, where the first condition includes one or any combination of the following:

the first message is received by the communication apparatus;

the communication apparatus is located in a first location; or a reference signal received power of the first cell is greater than a first threshold.

In a possible implementation, the method further includes: sending a second message to a second network device, where the second message is used to request to perform reestablishment in the first cell, the second message includes a cause value, and the cause value is used to indicate that cell reestablishment to be performed in the first cell is to be performed based on the first message.

For technical effects achieved in the second aspect or the possible implementations of the second aspect, refer to the description of the technical effects achieved in the first aspect or the corresponding implementations of the first aspect.

According to a third aspect, a communication method is provided. The communication method includes the following.

A second network device receives a reestablishment request message from a terminal device, where the reestablishment request message is used to request to perform cell reestablishment of the terminal device in a first cell, where the reestablishment request message includes a cause value, and the cause value is used to indicate that the cell reestablishment to be performed in the first cell is to be performed based on the first message sent by the first network device.

The second network sends a radio resource control reconfiguration message to the terminal device, where the radio resource control reconfiguration message is used by the terminal device to establish a connection to the first cell.

The method may be performed by a third communication apparatus, where the third communication apparatus may be a communication device or a communication apparatus, for example, a chip system, that can support the communication device to implement a function required in the method. For example, the communication device is a network device.

In a possible implementation, the communication method further includes:

The second network device receives context information of the terminal device from the first network device, where the context information is used by the second network device to establish a connection to the terminal device, and the first cell is a cell served by the second network device.

For technical effects achieved in the third aspect or the possible implementations of the third aspect, refer to the description of the technical effects achieved in the first aspect or the corresponding implementations of the first aspect.

According to a fourth aspect, a communication method is provided. The communication method includes: A first network device sends a first message to a terminal device, where the first message is used to indicate cell handover of the terminal device. The first network device broadcasts a second message, where the second message is used to indicate that the cell handover of the terminal device is to be performed when a first condition is met.

The method may be performed by a fourth communication apparatus, where the fourth communication apparatus may be a communication device or a communication apparatus, for example, a chip system, that can support the communication device to implement a function required in the method. For example, the communication device is a network device.

In this embodiment of this application, the second message may be used to indicate that the cell handover of the terminal device is to be performed when the first condition is met. This may be understood as: The second message is used to indicate a trigger condition for the terminal device to perform cell handover. For a plurality of terminal devices, trigger conditions for cell handover may be the same. Therefore, the first network device may broadcast the second message, and does not need to individually send the second message to each terminal device, thereby reducing system overheads.

In a possible implementation, the first condition includes one or any combination of the following:

the first message is received by the terminal device;

the terminal device is located in a first location; or a reference signal received power of a first cell is greater than a first threshold, where the first cell is a target cell to which the terminal device is to be handed over.

In this embodiment of this application, the first message may include the first condition. To be specific, the terminal device is indicated to perform cell handover only when the first condition is met, in other words, the terminal device performs cell handover in the first cell at an appropriate moment, to reduce, as much as possible, a possibility of a reestablishment failure or a long data transmission interruption time period caused by premature or delayed cell handover. The first condition may be: The first message is received by the terminal device, to be specific, the terminal device performs cell handover upon receiving the first message, to avoid, as much as possible, performing cell handover again due to a cell handover failure. Alternatively, the first condition may be: The terminal device is located in the first location, for example, a cell edge, to be specific, the terminal device performs cell handover only when reaching the cell edge, to avoid unnecessary cell handover. Alternatively, the first condition may be: The reference signal received power of the first cell is greater than the first threshold, to be specific, the cell handover is performed only when the reference signal received power that is of the first cell and that is measured by the terminal device is high, to ensure as much as possible that communication quality is high after the cell handover is performed.

In a possible implementation, the method further includes the following.

The first network device receives a reestablishment request message from the terminal device, where the reestablishment request message is used to request to perform cell handover of the terminal device in the first cell.

The reestablishment request message includes a cause value, where the cause value is used to indicate that the cell handover to be performed by the terminal device is to be performed based on the first message.

In this embodiment of this application, the cause value included in the reestablishment request message may indicate that a reason why the cell handover is performed is the same as a reason why the first network device sends the first message. Therefore, the first network device may determine a reason why the terminal device requests cell reestablishment, and send, based on the cause value, a radio resource control reconfiguration message to the terminal device, to ensure correctness of the radio resource control reconfiguration message, thereby improving connection efficiency.

According to a fifth aspect, a communication method is provided. The communication method includes: A communication apparatus receives a first message from a first network device, where the first message is used to indicate the communication apparatus to perform cell handover. The communication apparatus receives a second message from the first network device, where the second message is used to indicate that the communication apparatus is to perform cell handover when a first condition is met.

The method may be performed by a fifth communication apparatus, where the fifth communication apparatus may be a communication device or a communication apparatus, for example, a chip system, that can support the communication device to implement a function required in the method. For example, the communication device is a terminal device.

In a possible implementation, the first condition includes one or any combination of the following:

the first message is received by the communication apparatus;

the communication apparatus is located in a first location; or a reference signal received power of a first cell is greater than a first threshold, where the first cell is a target cell to which the communication apparatus is to be handed over.

In a possible implementation, the method further includes: sending a reestablishment request message to a second network device, where the reestablishment request message is used to request to perform cell handover of the communication apparatus in the first cell.

The reestablishment request message includes a cause value, where the cause value is used to indicate that the cell handover to be performed by the terminal device is to be performed based on the first message.

For technical effects achieved in the fifth aspect or the possible implementations of the fifth aspect, refer to the description of the technical effects achieved in the fourth aspect or the corresponding implementations of the fourth aspect.

According to a sixth aspect, a first type of communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing unit and a transceiver unit. For example, the communication apparatus is a network device.

The processing unit is configured to determine a first cell. The transceiver unit is configured to send a first message, where the first message includes an identifier of the first cell, and the identifier of the first cell is used to indicate a terminal device to perform cell reestablishment.

In a possible implementation, the transceiver unit is specifically configured to send the first message in a broadcast manner.

In a possible implementation, the first message further includes a first condition, where the first condition is used to indicate the terminal device to perform cell reestablishment when the first condition is met, where the first condition includes one or any combination of the following:

the first message is received by the terminal device;

the terminal device is located in a first location; or a reference signal received power of the first cell is greater than a first threshold.

In a possible implementation, the transceiver unit is further configured to: receive a reestablishment request message from the terminal device, where the reestablishment request message is used to request to perform cell reestablishment of the terminal device in the first cell.

The reestablishment request message includes a cause value, where the cause value is used to indicate that the cell reestablishment to be performed in the first cell is to be performed based on the first message.

In a possible implementation, the transceiver unit is further configured to: send context information of the terminal device to a second network device, where the context information is used by the second network device to establish a connection to the terminal device, and the first cell is a cell served by the second network device.

For technical effects achieved in the sixth aspect or the possible implementations of the sixth aspect, refer to the description of the technical effects achieved in the first aspect or the corresponding implementations of the first aspect.

According to a seventh aspect, a second type of communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing unit and a transceiver unit. For example, the communication apparatus is a terminal device.

The transceiver unit is configured to receive a first message from a first network device, where the first message carries an identifier of a first cell. The processing unit is configured to control, based on the identifier of the first cell, the transceiver unit to send a reestablishment request message in the first cell.

In a possible implementation, the first message includes a first condition used to indicate the communication apparatus to send the reestablishment request message in the first cell when the first condition is met, where the first condition includes one or any combination of the following:
  the first message is received by the communication apparatus;
  the communication apparatus is located in a first location; or
  a reference signal received power of the first cell is greater than a first threshold.

In a possible implementation, the transceiver unit is further configured to: send a second message to a second network device, where the second message is used to request to perform reestablishment in the first cell, the second message includes a cause value, and the cause value is used to indicate that cell reestablishment to be performed in the first cell is to be performed based on the first message.

For technical effects achieved in the seventh aspect or the possible implementations of the seventh aspect, refer to the description of the technical effects achieved in the second aspect or the corresponding implementations of the second aspect.

According to an eighth aspect, a third type of communication apparatus is provided. For example, the communication apparatus is the third communication apparatus described above. The communication apparatus is configured to perform the method according to any one of the third aspect or the possible implementations of the third aspect. Specifically, the communication apparatus may include modules configured to perform the method according to any one of the third aspect or the possible implementations of the third aspect. For example, the communication apparatus includes a processing unit and a transceiver unit. For example, the communication apparatus is a network device.

The transceiver unit is configured to receive a reestablishment request message from a terminal device, where the reestablishment request message is used to request to perform cell reestablishment of the terminal device in a first cell, where the reestablishment request message includes a cause value, and the cause value is used to indicate that the cell reestablishment to be performed in the first cell is to be performed based on the first message. The transceiver unit is further configured to send a radio resource control reconfiguration message to the terminal device under control of the processing unit, where the radio resource control reconfiguration message is used by the terminal device to establish a connection to the first cell.

In a possible implementation, the transceiver unit is further configured to receive context information of the terminal device from a first network device, where the context information is used by a second network device to establish a connection to the terminal device, and the first cell is a cell served by the second network device.

For technical effects achieved in the eighth aspect or the possible implementations of the eighth aspect, refer to the description of the technical effects achieved in the third aspect or the corresponding implementations of the third aspect.

According to a ninth aspect, a fourth type of communication apparatus is provided. For example, the communication apparatus is the fourth communication apparatus described above. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect. For example, the communication apparatus includes a processing unit and a transceiver unit. For example, the communication apparatus is a network device.

The transceiver unit is configured to send a first message to a terminal device under control of the processing unit, where the first message is used to indicate cell handover of the terminal device. The transceiver unit is further configured to broadcast a second message under control of the processing unit, where the second message is used to indicate that the cell handover of the terminal device is to be performed when a first condition is met.

In a possible implementation, the first condition includes one or any combination of the following:
  the first message is received by the terminal device;
  the terminal device is located in a first location; or
  a reference signal received power of a first cell is greater than a first threshold, where the first cell is a target cell to which the terminal device is to be handed over.

In a possible implementation, the transceiver unit is further configured to: receive a reestablishment request message from the terminal device, where the reestablishment request message is used to request to perform cell handover of the terminal device in the first cell. The reestablishment request message includes a cause value, where the cause value is used to indicate that the cell handover to be performed by the terminal device is to be performed based on the first message.

For technical effects achieved in the ninth aspect or the possible implementations of the ninth aspect, refer to the description of the technical effects achieved in the fourth aspect or the corresponding implementations of the fourth aspect.

According to a tenth aspect, a fifth type of communication apparatus is provided. For example, the communication apparatus is the fifth communication apparatus described above. The communication apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect. For example, the communication apparatus includes a processing unit and a transceiver unit. For example, the communication apparatus is a terminal device.

The transceiver unit is configured to receive a first message from a first network device under control of the processing unit, where the first message is used to indicate the communication apparatus to perform cell handover. The transceiver unit is further configured to receive a second message from the first network device, where the second message is used to indicate that the communication apparatus is to perform cell handover when a first condition is met.

In a possible implementation, the first condition includes one or any combination of the following:
  the first message is received by the communication apparatus;
  the communication apparatus is located in a first location; or
  a reference signal received power of a first cell is greater than a first threshold, where the first cell is a target cell to which the communication apparatus is to be handed over.

In a possible implementation, the transceiver unit is further configured to:
  send a reestablishment request message to a second network device, where the reestablishment request message is used to request to perform cell handover of the communication apparatus in the first cell, where the reestablishment request message includes a cause value, and the cause value is used to indicate that the cell handover to be performed by the terminal device is to be performed based on the first message.

For technical effects achieved in the tenth aspect or the possible implementations of the tenth aspect, refer to the description of the technical effects achieved in the fifth aspect or the corresponding implementations of the fifth aspect.

According to an eleventh aspect, a sixth type of communication apparatus is provided. For example, the communication apparatus is the first communication apparatus described above. The communication apparatus includes a processor and a transceiver. The processor and the transceiver are coupled to each other, and are configured to implement the method described in the first aspect or the possible designs of the first aspect. For example, the communication apparatus is a chip disposed in a communication device. For example, the communication device is a network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. The processor is configured to determine a first cell. The transceiver is configured to send a first message, where the first message includes an identifier of the first cell, and the identifier of the first cell is used to indicate a terminal device to perform cell reestablishment.

According to a twelfth aspect, a seventh type of communication apparatus is provided. For example, the communication apparatus is the second communication apparatus described above. The communication apparatus includes a processor and a transceiver. The processor and the transceiver are coupled to each other, and are configured to implement the method described in the second aspect or the possible designs of the second aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. The transceiver is configured to receive a first message from a first network device, where the first message carries an identifier of a first cell. The processor is configured to control, based on the identifier of the first cell, the transceiver unit to send a reestablishment request message in the first cell.

According to a thirteenth aspect, an eighth type of communication apparatus is provided. For example, the communication apparatus is the third communication apparatus described above. The communication apparatus includes a processor and a transceiver. The processor and the transceiver are coupled to each other, and are configured to implement the method described in the third aspect or the possible designs of the third aspect. For example, the communication apparatus is a chip disposed in a communication device. For example, the communication device is a network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. The transceiver is configured to receive a reestablishment request message from a terminal device, where the reestablishment request message is used to request to perform cell reestablishment of the terminal device in a first cell, where the reestablishment request message includes a cause value, and the cause value is used to indicate that the cell reestablishment to be performed in the first cell is to be performed based on the first message. The transceiver is further configured to send a radio resource control reconfiguration message to the terminal device under control of the processor, where the radio resource control reconfiguration message is used by the terminal device to establish a connection to the first cell.

According to a fourteenth aspect, a ninth type of communication apparatus is provided. For example, the communication apparatus is the fourth communication apparatus described above. The communication apparatus includes a processor and a transceiver. The processor and the transceiver are coupled to each other, and are configured to implement the method described in the fourth aspect or the possible designs of the fourth aspect. For example, the communication apparatus is a chip disposed in a communication device. For example, the communication device is a network device. The transceiver is configured to send a first message to a terminal device under control of the processor, where the first message is used to indicate cell handover of the terminal device. The transceiver is further configured to broadcast a second message under control of the processor, where the second message is used to indicate that the cell handover of the terminal device is to be performed when a first condition is met.

According to a fifteenth aspect, a tenth type of communication apparatus is provided. For example, the communication apparatus is the fifth communication apparatus described above. The communication apparatus includes a processor and a transceiver. The processor and the transceiver are coupled to each other, and are configured to implement the method described in the first aspect or the possible designs of the first aspect. For example, the communication apparatus is a chip disposed in a communication device. For example, the communication device is a terminal device. The transceiver is configured to receive a first message from a first network device under control of the processor, where the first message is used to indicate the communication apparatus to perform cell handover. The transceiver is further configured to receive a second message from the first network device, where the second message is used to indicate that the communication apparatus is to perform cell handover when a first condition is met.

According to a sixteenth aspect, a communication system is provided. The communication system may include the first type of communication apparatus according to the sixth aspect and the second type of communication apparatus according to the seventh aspect. Alternatively, the communication system may include the first type of communication apparatus according to the sixth aspect, the second type of communication apparatus according to the seventh aspect, and the third type of communication apparatus according to the eighth aspect. Alternatively, the communication system may include the fourth type of communication apparatus according to the ninth aspect and the fifth type of communication apparatus according to the tenth aspect. Alternatively, the communication system may include the sixth type of communication apparatus according to the eleventh aspect and the seventh type of communication apparatus according to the twelfth aspect. Alternatively, the communication system may include the sixth type of communication apparatus according to the eleventh aspect, the seventh type of communication apparatus according to the twelfth aspect, and the eighth type of communication apparatus according to the thirteenth aspect. Alternatively, the communication system may include the ninth type of communication apparatus according to the fourteenth aspect and the tenth type of communication apparatus according to the fifteenth aspect.

According to a seventeenth aspect, a computer storage medium is provided. The computer-readable storage medium stores instructions; and when the instructions are run on a computer, the computer is enabled to: perform the method according to any one of the first aspect or the possible designs of the first aspect; perform the method according to any one of the second aspect or the possible designs of the second aspect; perform the method according to any one of the third aspect or the possible designs of the third aspect; perform the method according to any one of the fourth aspect or the possible designs of the fourth aspect; or perform the method according to any one of the fifth aspect or the possible designs of the fifth aspect.

According to an eighteenth aspect, a computer program product including instructions is provided. The computer program product stores instructions; and when the instructions are run on a computer, the computer is enabled to: perform the method according to any one of the first aspect or the possible designs of the first aspect; perform the method according to any one of the second aspect or the possible designs of the second aspect; perform the method according to any one of the third aspect or the possible designs of the third aspect; perform the method according to any one of the fourth aspect or the possible designs of the fourth aspect; or perform the method according to any one of the fifth aspect or the possible designs of the fifth aspect.

In the embodiments of this application, the first network device may determine a cell, for example, the first cell, in which the terminal device needs to perform reestablishment, and then the first network device may send a message including the identifier of the first cell to the terminal device, to notify the terminal device to perform reestablishment in the first cell. This may be understood as: The first network device may indicate the terminal device to perform, in advance, reestablishment in the first cell, so that the terminal device performs cell reestablishment without waiting for a radio link failure to occur on the terminal device, thereby reducing a data transmission interruption time period of the terminal device as much as possible.

DETAILED DESCRIPTION OF ILLUSTRATIVE EMBODIMENTS

Figure 1:
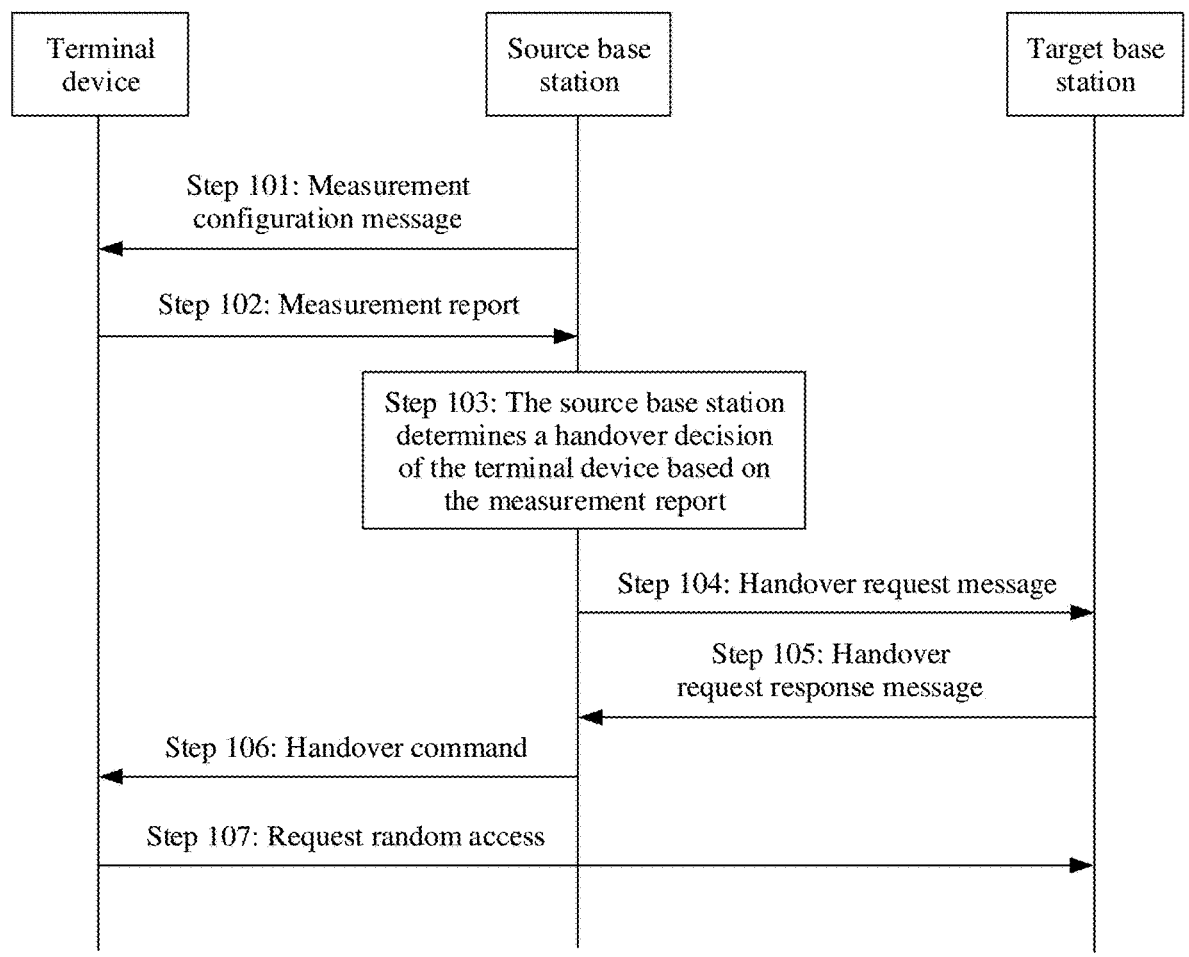
FIG. 1 is a schematic flowchart of cell handover according to a conventional technology.

To make objectives, technical solutions, and advantages of the embodiments of this application clearer, the following further describes the embodiments of this application in detail with reference to the accompanying drawings.

Before this application is described, some terms of the embodiments of this application are first briefly explained and described, to help a person skilled in the art have a better understanding.

(1) A terminal device includes a device that provides a user with voice and/or data connectivity, for example, may include a handheld device with a wireless connection function or a processing device connected to a wireless modem. The terminal device may communicate with a core network through a radio access network (RAN) and exchange a voice and/or data with the RAN. The terminal device may include user equipment (UE), a wireless terminal device, a mobile terminal device, a device-to-device (D2D) terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may include a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

(2) A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an internet protocol (IP) packet and serve as a router between the terminal device and a rest part of the access network, where the rest part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional Node B) in a long term evolution (long term evolution, LTE) system or a long term evolution-advanced (long term evolution-advanced, LTE-A) system, may include a next generation NodeB (gNB) in a 5G NR system, or may include a centralized unit (CU) and a distributed unit (DU) in a cloud radio access network (Cloud RAN) system. This is not limited in the embodiments of this application.

(3) The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship between associated objects and represents that three relationships may exist. For example, A and/or B may represent the following three cases: Only A exists, both A and B exist, and only B exists. In addition, the character "/" usually indicates an "or" relationship between the associated objects unless otherwise stated.

Unless otherwise stated, ordinal numbers such as "first" and "second" in the embodiments of this application are used to distinguish between a plurality of objects, and are not intended to limit a sequence, a time sequence, priorities, or importance of the plurality of objects. For example, a first network device and a second network device are only used to distinguish between different network devices, and are not intended to limit functions, priorities, or importance of the two network devices.

The foregoing describes some concepts in the embodiments of this application. The following describes technical features in the embodiments of this application.

Due to movement of a terminal device, the terminal device that is using a network service may move and be handed over from a cell (a source cell) provided by a base station for the terminal device to another cell (a target cell). To ensure continuity of communication and quality of service, a communication link between the terminal device and the source cell needs to be transferred to the target cell. A process of transferring the communication link between the terminal device and the source cell to the target cell is also referred to as a process of cell handover.

FIG. 1 is a schematic flowchart of cell handover. In FIG. 1, an example in which a source cell is a cell served by a source base station and a target cell is a cell served by a target base station is used. The cell handover includes the following steps.

Step 101: The source base station sends a measurement configuration message to a terminal device, so that the terminal device receives the measurement configuration message.

The measurement configuration message may include a to-be-measured object, a cell list, a reporting manner, and the like. After receiving the measurement configuration message, the terminal device may measure a neighboring cell based on the measurement configuration message, to obtain a measurement report (measurement reporting).

Step 102: The terminal device sends the measurement report to the source base station.

The measurement report may include a reference signal received power of a serving cell, signal quality of the neighboring cell, and the like, so that the source base station determines, based on the measurement report, whether the terminal device is to perform cell handover.

Step 103: The source base station determines a handover decision of the terminal device based on the measurement report.

The handover decision refers to determining whether the terminal device is to perform cell handover. If determining that the terminal device needs to perform cell handover, the source base station may send a handover request (handover request) message to the target base station.

Step 104: The source base station sends the handover request message to the target base station.

The base station determines, based on the measurement report, that the terminal device needs to perform cell handover, and sends the handover request message to the target base station. The handover request message is used to request the cell handover.

Step 105: The target base station sends a handover request response (handover response) message to the source base station, where the handover response message may include configuration information of the target base station.

The configuration information of the target base station may be used by the terminal device to establish a connection to the cell served by the target base station.

Step 106: The source base station sends a handover command to the terminal device.

Step 107: The terminal device initiates a random access process to the target base station.

The handover command is used to indicate the terminal device to perform cell handover. The terminal device receives the handover command in the source cell and parses the handover command to obtain configuration information of the target cell, in other words, the terminal device obtains a configuration of the terminal device in the target cell, so that the terminal device may be handed over to the target cell based on the configuration.

In a scenario, a base station may be deployed in an NTN, for example, the base station is deployed on a low-earth-orbit satellite. For ease of description, this scenario is referred to as a first scenario below. In the first scenario, the satellite moves around the earth, and the base station moves along with the satellite. In this case, a serving cell provided by the base station for the terminal device also moves. Because the satellite moves fast, according to the procedure shown in FIG. 1, when the base station determines that the terminal device should perform cell handover, the terminal device may not be located within coverage of the base station. If the base station sends a handover command to the terminal device at this moment, the terminal device cannot receive the handover command, and consequently the terminal device cannot be handed over to a cell in time. Therefore, a radio link failure is triggered, and data transmission performance of the terminal device is affected. In addition, because the satellite moves fast, for a cell, a plurality of terminal devices located in the cell may need to perform cell handover. In this case, the base station needs to send handover commands to the plurality of terminal devices within a short time period, in other words, the base station needs to send a large quantity of handover commands. However, because resources of the base station are limited within the short time period, the base station may fail to send the handover command to each one of the plurality of terminal devices within the short time period. As a result, a part of the terminal devices cannot receive the handover command in time, and consequently cannot be handed over to a cell in time. Therefore, the radio link failure is triggered, and the data transmission performance of the terminal device is affected.

In a second scenario, a base station is deployed on the ground, and a satellite forwards a signal of the base station. Assuming that the base station is stationary and the satellite moves relative to the ground, that is, a source of the signal forwarded by the satellite, namely, the base station, changes. In this case, an overlapping area covered by the satellite and the base station may also change. For example, at a first moment, the satellite may receive a signal of a base station 1. At a second moment, the satellite may receive the signal of the base station 1 and a signal of a base station 2. At a third moment, the satellite may receive the signal of the base station 2. For the terminal device, the terminal device may be located within coverage of the base station 1 at a previous moment, and the terminal device may be located within coverage of the base station 2 at a next moment. In this scenario, to avoid interruption of a communication service, the terminal device also needs to be handed over from a cell to another cell. Because the satellite moves fast, according to the procedure shown in FIG. 1, the terminal device usually cannot receive a handover command from the base station, and consequently the terminal device cannot be handed over to the cell in time. Therefore, a radio link failure is triggered, and data transmission performance of the terminal device is affected. In addition, in this scenario, at a switching time point of the source of the signal forwarded by the satellite, in other words, when the source of the signal changes, a first cell covered by the source of the signal before handover changes to a second cell covered by a source of a signal after handover. As a result, all terminal devices located in the first cell need to perform cell handover. Therefore, the base station needs to send handover commands to all the terminal devices within a short time period. In other words, compared with the foregoing first scenario, the second scenario requires the base station to send more handover commands within the short time period. Similarly, the handover command may not be sent to all the terminal devices within the short time period. As a result, a part of the terminal devices cannot receive the handover command in time, and consequently cannot be handed over to a cell in time. Therefore, the radio link failure is triggered, and the data transmission performance of the terminal device is affected.

In view of this, the technical solutions in the embodiments of this application are provided. In the embodiments of this application, a first network device may determine a cell, for example, a first cell, in which a terminal device needs to perform reestablishment, and then the first network device may send a message including an identifier of the first cell to the terminal device, to notify the terminal device to perform reestablishment in the first cell. That is, the first network device may indicate the terminal device to perform, in advance, reestablishment in the first cell, so that the terminal device performs cell reestablishment without waiting for a radio link failure to occur on the terminal device, to improve a success rate of cell handover as much as possible, thereby reducing a data transmission interruption time period of the terminal device as much as possible.

Figure 2:
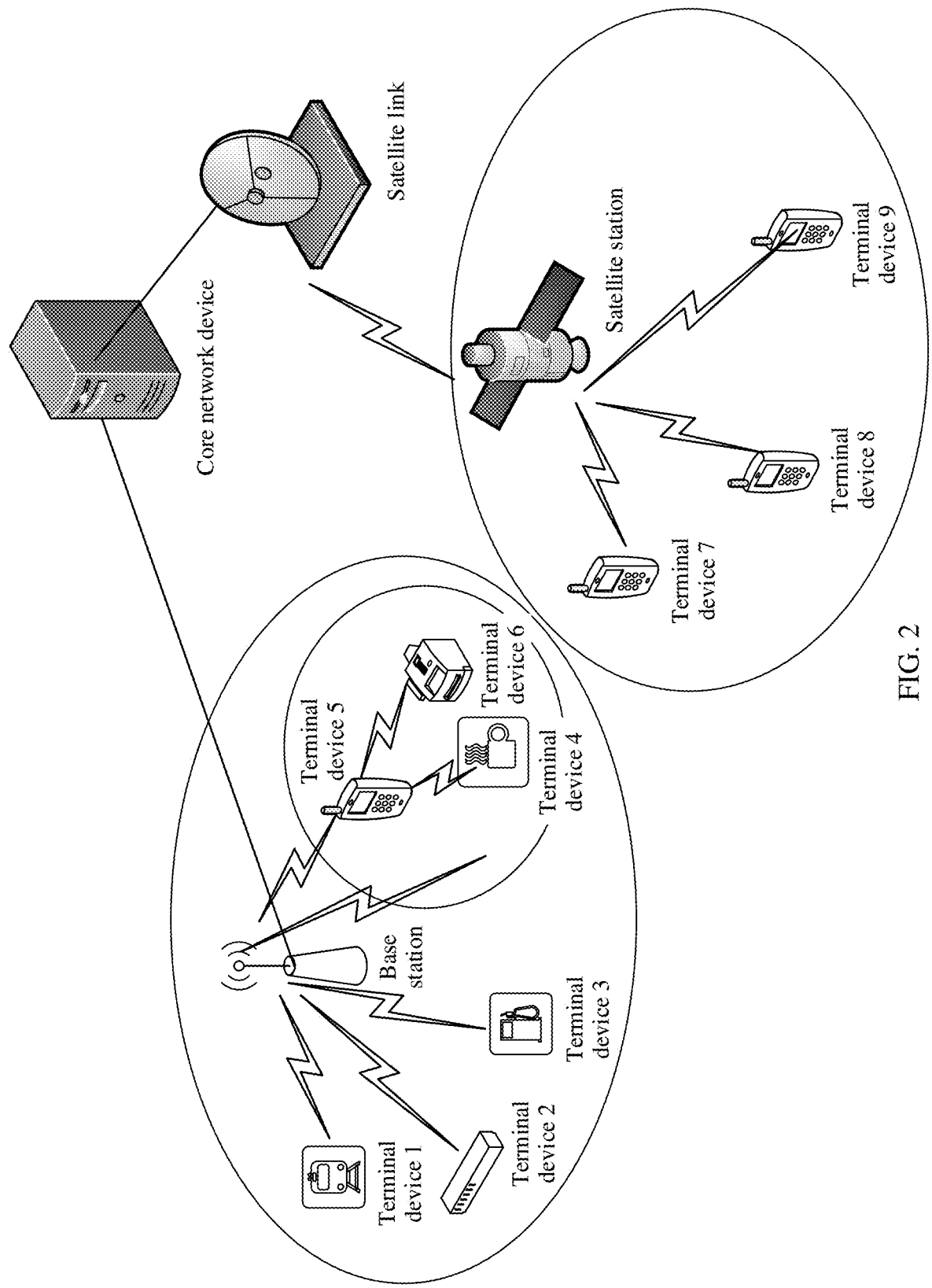
FIG. 2 is a schematic diagram of a network architecture according to an embodiment of this application.

FIG. 2 shows an application scenario according to an embodiment of this application. FIG. 2 includes a core network device, a base station, a satellite station, and a plurality of terminal devices. The plurality of terminal devices may be a cellular phone, a smartphone, a portable computer, a handheld communication device, a handheld computing device, a satellite radio apparatus, a global positioning system, a PDA, and/or any other suitable device used for communication in a wireless communication system. The base station and the satellite station may be connected to the core network device in different manners, and communicate with the core network device. For example, the satellite station may communicate with the core network device via a satellite link. The base station corresponds to different devices in different systems. For example, the base station may correspond to an eNB in a 4th generation mobile communication technology (4G) system, and may correspond to a gNB in a 5G system. The plurality of terminal devices may all be connected to the base station or the satellite station, and can all communicate with the base station or the satellite station. The satellite station may alternatively be a terminal device configured to serve the terminal device.

For example, in FIG. 2, nine terminal devices are included. A communication system includes six terminal devices and the base station, and another communication system includes the remaining three terminal devices and the satellite station. For example, the communication system includes a terminal device 1 to a terminal device 6 and the base station, and the terminal device 1 to the terminal device 6 separately communicate with the base station. The another communication system includes a terminal device 7 to a terminal device 9 and the satellite station, and the terminal device 7 to the terminal device 9 communicate with the base station via the satellite station. The satellite station may be a terminal device configured to serve the terminal device 1 to the terminal device 6. In addition, a communication system may include the terminal device 4 to the terminal device 6. For example, the base station may communicate with the terminal device 1, the terminal device 2, and the terminal device 5, and the terminal device 5 may communicate with the terminal device 4 and the terminal device 6.

It should be noted that a quantity of terminal devices, a quantity of base stations, and a quantity of satellite stations in FIG. 2 are merely examples. The quantity of terminal devices, the quantity of base stations, and the quantity of satellite stations are not limited in this embodiment of this application.

In addition, this application is not limited to a satellite communication scenario. For example, this application is further applicable to a railway cellular communication scenario, or any other scenario in which a track of a terminal device can be learned of in a network, provided that a next serving cell serving the terminal device, namely, the first cell, can be determined.

The following describes, with reference to the accompanying drawings, the technical solutions provided in the embodiments of this application.

Figure 3:
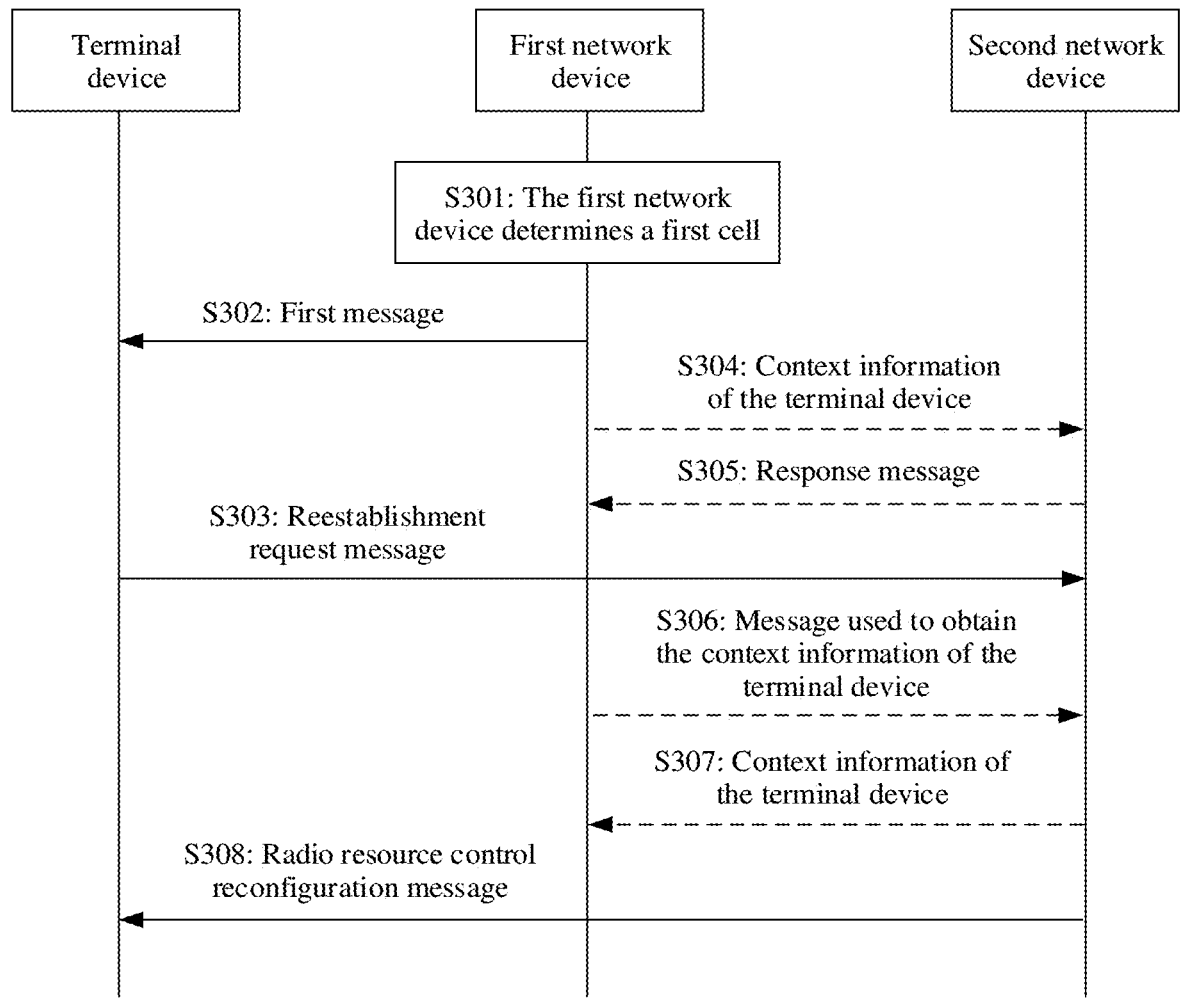
FIG. 3 is a schematic flowchart of a communication method according to an embodiment of this application.

An embodiment of this application provides a communication method. FIG. 3 is a flowchart of the method. In the following description, an example in which the method is applied to the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support the network device to implement a function required in the method, or the first communication apparatus may be a terminal device or a communication apparatus (for example, a chip system) that can support the terminal device to implement a function required in the method. Similarly, the second communication apparatus may be a network device or a communication apparatus that can support the network device to implement a function required in the method, or the second communication apparatus may be a terminal device or a communication apparatus (for example, a chip system) that can support the terminal device to implement a function required in the method. In addition, implementations of the first communication apparatus and the second communication apparatus are not limited. For example, both the first communication apparatus and the second communication apparatus are terminal devices, or the first communication apparatus is a terminal device and the second communication apparatus is a communication apparatus that can support a terminal device to implement a function required in the method.

For ease of description, the following uses an example in which the method is performed by a network device and a terminal device, that is, an example in which the first communication apparatus is the network device and the second communication apparatus is the terminal device. For example, the network device in the following may be the network device in FIG. 3, and the terminal device in the following may be any one of the terminal device 1 to the terminal device 9 in FIG. 2. It should be noted that, this embodiment of this application merely uses an example in which the communication method is performed by the network device and the terminal device, but is not limited to this scenario.

A procedure of the communication method provided in this embodiment of this application is described as follows.

S301: A first network device determines a first cell.

In this embodiment of this application, the first network device may be the base station in the foregoing first scenario, that is, the first network device may be deployed on a satellite. Alternatively, the first network device may be the base station in the foregoing second scenario, that is, the first network device is deployed on the ground. The first network device may provide a plurality of cells for a terminal device. In the first scenario and the second scenario, as the satellite moves, the terminal device is handed over from a cell to another cell for continuity of a communication service. The first cell may be considered as a target cell to which the terminal device needs to be handed over.

In the first scenario, the first network device is deployed on the satellite, and the satellite moves, so that a serving cell provided by the first network device for the terminal device also moves. For example, the satellite is about 1000 km above the ground, and a radius of the serving cell provided by the base station for the terminal device on the ground is 200 km. A moving speed of the satellite is high, and it takes about one minute for the terminal device to move out of the serving cell after entering the serving cell. Although the moving speed of the satellite is high, a moving track of the satellite is relatively fixed. To be specific, an absolute location of the satellite at a next moment may be predicted at a current moment, to determine the first cell based on the absolute location of the satellite.

For example, an ephemeris may represent a moving track of any satellite, and an absolute location of a satellite at a moment can be determined by using the ephemeris. Assuming that the first network device learns of the ephemeris and a distribution map of a cell corresponding to an absolute location of each satellite, the first network device may predict the absolute location of the satellite at a next moment based on the ephemeris, and determine, based on the absolute location and the distribution map, the first cell, namely, a cell that can provide a service for the terminal device at the next moment.

In some embodiments, the first cell may be a cell served by the first network device. For example, the satellite is located in a first location at a first moment, and the satellite is located in a second location at a second moment after the first moment. When the satellite is located in the first location, the cell provided by the first network device includes a plurality of cells. For example, a cell in a plurality of second cells is a serving cell serving the terminal device. When the satellite is located in the second location, the cell provided by the first network device also includes a plurality of cells, for example, a plurality of third cells. If the terminal device is located within coverage of a third cell in the plurality of third cells, the third cell may provide a service for the terminal device. In this case, the first cell is the third cell, and is the cell served by the first network device.

In some embodiments, the first cell may be a cell served by another network device, for example, a cell served by a second network device. For example, the satellite is located in a first location at a first moment, and the satellite is located in a second location at a second moment after the first moment. When the satellite is located in the first location, a cell provided by the first network device includes a plurality of cells. For example, a cell in a plurality of second cells is a serving cell serving the terminal device. When the satellite is located in the second location, the cell provided by the first network device also includes a plurality of cells, for example, a plurality of third cells. If the terminal device is not located within coverage of the plurality of third cells, but is located within coverage of the second network device, the first cell is the cell served by the second network device. In this case, assuming that the first network device learns of an ephemeris of a satellite corresponding to the second network device and a distribution map of a cell served by the satellite, the first network device may determine, based on the ephemeris of the satellite corresponding to the second network device and the distribution map of the cell served by the satellite, that the first cell is the cell served by the second network device.

Similarly, in the second scenario, the first network device may determine a current absolute location of a satellite based on an ephemeris, to determine a coverage cell of the satellite based on the absolute location and a distribution map of a cell served by the satellite, and determine the first cell by using the coverage cell. If the coverage cell and the plurality of cells provided by the first network device do not overlap, the first cell may be the cell served by the second network device. If the coverage cell and the plurality of cells provided by the first network device overlap, the first cell may be the cell served by the first network device, or may be a neighboring cell of the serving cell serving the terminal device.

S302: The first network device sends a first message, so that the terminal device receives the first message.

After determining the first cell, the first network device may send an identifier of the first cell to the terminal device. For example, the first network device may send the first message to the terminal device, where the first message may include the identifier of the first cell. The identifier of the first cell may be used by the terminal device to perform cell reestablishment in the first cell. Alternatively, it may be considered that the first message may indicate the terminal device to send a reestablishment request message in the first cell, where the reestablishment request message is used to request to perform cell reestablishment in the first cell, that is, request to establish a connection to the first cell. After receiving the first message, the terminal device may obtain the identifier of the first cell from the first message, to determine the first cell based on the identifier of the first cell, and perform cell reestablishment in the first cell.

It should be noted that the cell reestablishment herein may refer to: The terminal device establishes a connection to the first cell for the first time, or the terminal device establishes a connection to the first cell after a cell handover failure.

For the terminal device, when the first network device sends the first message, the terminal device may not need to perform cell reestablishment. For example, the terminal device may still be located in the serving cell, that is, the terminal device does not need to be handed over to a cell. However, in this embodiment of this application, the first network device does not consider whether the terminal device actually needs to be handed over to a cell, but predicts a first cell that may subsequently serve the terminal device, and indicates the terminal device to perform cell reestablishment in the first cell. This may be considered as: The first network device indicates, in advance, the terminal device to perform cell reestablishment. In this way, the terminal device performs cell reestablishment without waiting for a radio link failure to occur on the terminal device. For example, the terminal device performs reestablishment in the first cell when receiving the first message, to reduce a data transmission interruption time period of the terminal device as much as possible.

In some embodiments, the first network device may control some specific terminal devices to perform reestablishment in the first cell. In this case, the first network device may send the first message to the corresponding terminal device by using radio resource control (RRC) signaling. For example, the first network device may control the terminal device 1 and the terminal device 2 to perform reestablishment in the first cell. The first network device may send RRC signaling 1 to the terminal device 1, where the RRC signaling 1 may carry the first message. The first network device may send RRC signaling 2 to the terminal device 2, where the RRC signaling 2 may carry the first message.

In some embodiments, the first network device may broadcast the first message. For example, the first network device may broadcast the first message by using system information, or broadcast the first message through paging. For example, the first message may be carried on a physical downlink control channel (PDCCH), or may be carried on a physical downlink shared channel (PDSCH). Alternatively, the first message may be carried on a media access control (MAC) control element (CE).

If the first network device determines that the terminal device needs to perform cell handover, different handover commands may be sent by the first network device or the second network device to different terminal devices. For example, configuration information that is included in the handover commands and that is used by the terminal devices to establish connections to the first cell is different. If the first network device individually sends the handover command to each terminal device, it is clear that signaling overheads are large. Therefore, in this embodiment of this application, the first network device broadcasts the first message, to indicate, in advance, a plurality of terminal devices to perform cell reestablishment in the first cell. The first message does not need to be individually sent to each terminal device, so that the signaling overheads may be reduced. In this specification, if the first network device broadcasts the first message, the terminal device may be any one of the plurality of terminal devices.

In some embodiments, the first message may include a first condition, where the first condition may indicate the terminal device to perform cell reestablishment when the first condition is met. Specifically, for the terminal device, the cell reestablishment is performed based on a condition. After receiving the first message, the terminal device may determine whether the first condition is met, and perform cell reestablishment when the first condition is met. Alternatively, when the first condition is not met, the terminal device does not perform cell reestablishment. In other words, the terminal device performs cell reestablishment in the first cell at an appropriate moment, to reduce, as much as possible, a possibility of a cell reestablishment failure or a long data transmission interruption time period caused by premature or delayed cell reestablishment. It should be noted that the first condition may alternatively not be included in the first message. For example, the first condition is carried in another message, and the first network device notifies the terminal device of the first condition by sending the another message to the terminal device. A manner in which the first network device sends the first condition to the terminal device is not limited in this embodiment of this application.

For example, the first condition may be: The first message is received by the terminal device, to be specific, the terminal device performs cell reestablishment upon receiving the first message. Alternatively, this may be understood as: The first condition is a trigger event, and the event is that the terminal device has received the first message. For example, in the foregoing second scenario, the terminal device may be located in the serving cell at a previous moment, and may not be located within a range of the serving cell at a next moment. In this case, the terminal device performs cell reestablishment upon receiving the first message. This may be considered as performing cell reestablishment in advance, to prevent a communication service interruption that occurs when the terminal device does not perform cell reestablishment until a cell handover failure occurs.

For another example, the first condition may be: The terminal device is located in a first location, to be specific, the terminal device receives the first message, does not perform cell reestablishment before reaching the first location, and performs cell reestablishment only when reaching the first location. If the first condition is considered as a trigger event, the event is that the terminal device has reached the first location. For example, a time period in which the terminal device enters and moves out of the serving cell in the foregoing first scenario is longer than a time period in which the terminal device enters and moves out of the serving cell in the foregoing second scenario. In this case, the terminal device may perform cell reestablishment only when reaching an edge of the serving cell, to avoid unnecessary cell reestablishment and save system resources. For example, the first location may be the edge of the serving cell. To be specific, if the terminal device has not reached the edge of the serving cell, it may not be necessary for the terminal device to be handed over to a cell. In this case, the cell reestablishment is not performed. Alternatively, the first location may be a location at a distance from the edge of the serving cell, or the first location may be a location at a distance from the center of the serving cell.

After obtaining the first condition, the terminal device may determine, based on a constellation diagram, a moment at which the cell reestablishment is to be performed. The constellation diagram may be used to indicate a coordinate range of a cell on the ground. In this case, the terminal device having a positioning function may learn of a current location, then determine, based on the constellation diagram, whether the first location is reached, and further determine whether to perform cell reestablishment.

For still another example, the first condition may be: A reference signal received power of the first cell is greater than a first threshold. If the first condition is considered as a trigger event, the event is that the reference signal received power that is measured by the terminal device and that is of the first cell is greater than the first threshold. To be specific, after receiving the first message, the terminal device measures the reference signal received power of the first cell. If the measured reference signal received power of the first cell is less than the first threshold, the cell reestablishment is not performed. The cell reestablishment is not performed until the measured reference signal received power of the first cell is greater than the first threshold, to ensure as much as possible that communication quality is high after the cell reestablishment. Alternatively, the first condition may be: A reference signal received power of the first cell is greater than or equal to a first threshold, and a reference signal received power of the current serving cell is less than or equal to a second threshold. Alternatively, the first condition may be: A reference signal received power of the first cell exceeds a reference signal received power of the current serving cell, and an excess part is greater than or equal to a third threshold.

The foregoing enumerates three possible first conditions. In some embodiments, the first condition may alternatively be any combination of the foregoing three possible conditions. For example, the first condition may be: The terminal device is located in the first location, and the reference signal received power of the first cell is greater than the first threshold.

In some embodiments, the first message may alternatively include the first location or the first threshold. In this case, if the first message does not include the first condition, it may be considered that the terminal device performs cell reestablishment upon receiving the first message. If the first message includes the first location, it may be considered that the terminal device receives the first message, and performs cell reestablishment only when reaching the first location. If the first message includes the first threshold, it may be considered that the terminal device receives the first message, and performs cell reestablishment only when the measured reference signal received power of the first cell is greater than the first threshold.

S303: The terminal device sends the reestablishment request message in the first cell.

The reestablishment request message may be a radio resource control reestablishment (RRC_Reestablishment)

message, where the reestablishment request message is used to request to perform cell reestablishment of the terminal device in the first cell. If the first cell is the cell served by the first network device, the terminal device sends the reestablishment request message to the first network device. Alternatively, if the first cell is the cell served by the second network device, the terminal device sends the reestablishment request message to the second network device. This is used as an example in FIG. 3.

The reestablishment request message may include a cause value, where the cause value may indicate a reason why the terminal device is to perform cell reestablishment in the first cell. For example, in this embodiment of this application, the cause value may include a same reason as a reason why the first network device sends the first message, in other words, the cell reestablishment to be performed by the terminal device is to be performed based on the first message. Specifically, the cause value may be a satellite movement, a base station movement, or a satellite feeder link switch. Certainly, in some embodiments, the cause value may alternatively include a handover failure, a reconfiguration failure, another failure, or the like. The first network device or the second network device may send a radio resource control reconfiguration (RRC_reconfiguration) message to the terminal device based on the cause value included in the reestablishment request message, to ensure correctness of the RRC_reconfiguration message, thereby improving connection efficiency.

S304: The first network device sends context information of the terminal device to the second network device, so that the second network device receives the context information.

The context information may be used by the second network device to establish a connection to the terminal device. Considering that the first cell may be the cell served by the second network device, the first network device may notify the second network device of the context information of the terminal device. In this way, the second network device may set a corresponding reconfiguration message for the terminal device based on the context information, for example, to ensure as much as possible that the terminal device is successfully connected to the first cell.

For example, the first network device may send, to the second network device, context information of a terminal device located at an edge of a cell. Compared with a terminal device located at the center of the cell, the terminal device located at the edge of the cell may be a terminal device that needs to perform cell reestablishment. Therefore, in this embodiment of this application, if the first network device can determine a location of the terminal device, the first network device may send, to the second network device, the context information of the terminal device located at the edge of the cell. In this way, the first network device does not need to send contexts of all terminal devices, thereby saving the system resources.

For another example, the first network device may send context information of all terminal devices to the second network device. For example, in the foregoing second scenario, at the switching time point of the source of the signal forwarded by the satellite, the satellite may receive a signal of the first network device at a previous moment, and may receive a signal of the second network device at a next moment. For the terminal device, the terminal device is located within coverage of the first network device at the previous moment, and is located within coverage of the second network device at the next moment, that is, a coverage cell of an area changes. In this scenario, terminal devices located in a same cell may all need to be handed over to another cell. In this case, the first network device may send, to the second network device, context information of all the terminal devices located in the cell before the switching time point of the source of the signal forwarded by the satellite, to ensure as much as possible that the terminal devices that need to perform cell handover can successfully perform cell reestablishment.

S305: The second network device sends a response message to the first network device, so that the first network device receives the response message.

The second network device receives the context information of the terminal device, and may send the response message to the first network device, to notify the first network device that the second network device has or has not received the context information, so that the first network device may determine, based on the response message, whether to send the context information of the terminal device to the second network device again.

S306: The second network device sends, to the first network device, a message used to obtain the context information of the terminal device, so that the first network device receives the message.

If the second network device does not receive the context information of the terminal device, the second network device may obtain the context information of the terminal device from the first network device. For example, the second network device sends a terminal device context fetch (UE context fetch) message to the first network device, to obtain the context information of the terminal device.

S307: The first network device sends the context information of the terminal device to the second network device.

The first network device may send, to the second network device, a response message of the terminal device context fetch message, for example, a UE context fetch response message. The UE context fetch response message may include the context information of the terminal device.

It should be noted that if the first cell is the cell served by the first network device, the first network device does not need to send the context information of the terminal device to the second network device. Therefore, S304, S305, S306, and S307 are not mandatory steps, and are shown by using dashed lines in FIG. 3. In addition, if S304 exists, S306 may not be performed. Conversely, if S306 exists, S304 may not be performed either. In addition, S304 may be performed before S303, to be specific, after sending the first message, the first network device may actively notify the second network device of the context information of the terminal device. In this way, a delay caused by obtaining, by the second network device, the context information of the terminal device from the first network device when the terminal device performs cell reestablishment may be avoided, thereby reducing, to some extent, signaling overheads on a network interface and a delay of communication between network devices.

S308: The second network device sends a radio resource control reconfiguration message to the terminal device.

The second network device may generate the RRC_reconfiguration message based on the context information of the terminal device, and send the RRC_reconfiguration message to the terminal device, so that the terminal device establishes the connection to the first cell based on information, for example, a measurement configuration, mobility control information, and radio resource configuration dedicated information, that is carried in the RRC reconfiguration message.

Figure 4:
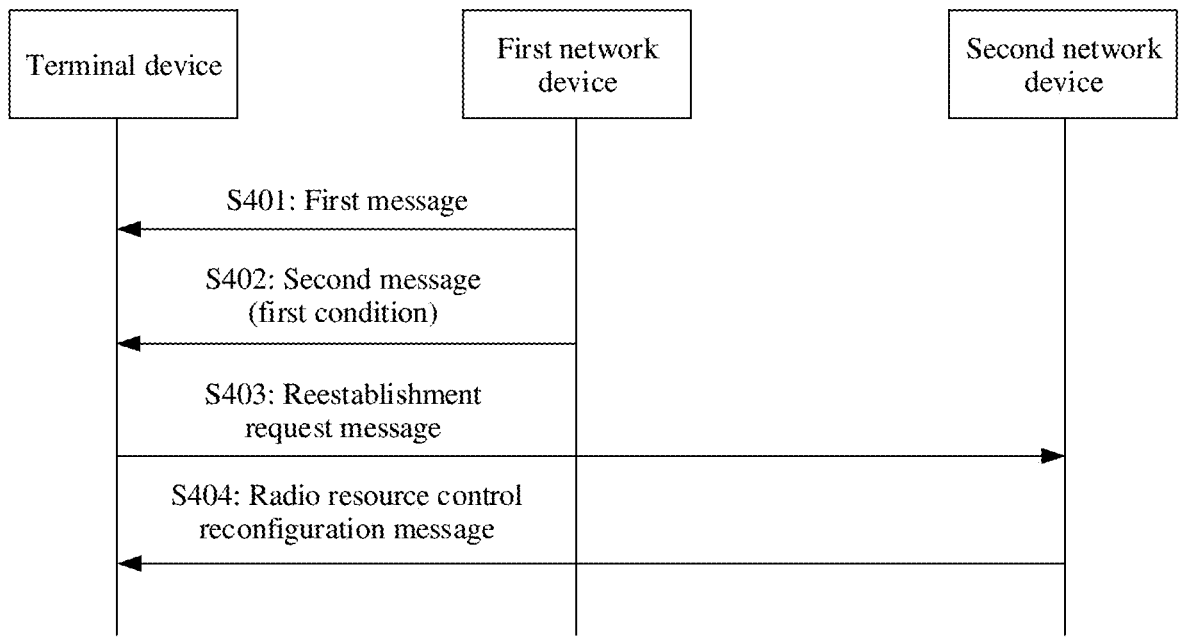
FIG. 4 is a schematic flowchart of another communication method according to an embodiment of this application.

FIG. 4 is a schematic flowchart of another communication method according to an embodiment of this application. In the following description, an example in which the method is applied to the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support the network device to implement a function required in the method, or the first communication apparatus may be a terminal device or a communication apparatus (for example, a chip system) that can support the terminal device to implement a function required in the method. Similarly, the second communication apparatus may be a network device or a communication apparatus that can support the network device to implement a function required in the method, or the second communication apparatus may be a terminal device or a communication apparatus (for example, a chip system) that can support the terminal device to implement a function required in the method. In addition, implementations of the first communication apparatus and the second communication apparatus are not limited. For example, both the first communication apparatus and the second communication apparatus are terminal devices, or the first communication apparatus is a terminal device and the second communication apparatus is a communication apparatus that can support a terminal device to implement a function required in the method.

For ease of description, the following uses an example in which the method is performed by a network device and a terminal device, that is, an example in which the first communication apparatus is the network device and the second communication apparatus is the terminal device. For example, the network device in the following may be the network device in FIG. 3, and the terminal device in the following may be any one of the terminal device 1 to the terminal device 9 in FIG. 2. It should be noted that, this embodiment of this application merely uses an example in which the communication method is performed by the network device and the terminal device, but is not limited to this scenario.

A procedure of the communication method provided in this embodiment of this application is described as follows.

S401: A first network device sends a first message to a terminal device.

The first message may be used to indicate cell handover of the terminal device, that is, indicate the terminal device to perform cell handover. The first message may be the handover command in FIG. 1. For details about when the first network device sends the first message to the terminal device, refer to the description about the procedure in FIG. 1. Details are not described herein again.

S402: The first network device broadcasts a second message.

The second message may be used to indicate that the cell handover of the terminal device is to be performed when the first condition is met. This may be understood as: The second message is used to indicate a trigger condition for the terminal device to perform cell handover. For a specific implementation of the first condition, refer to the foregoing description about the first condition. Details are not described herein again.

Configuration information used by different terminal devices to perform cell handover may be different. For example, configuration information used by terminal devices with different functions to perform cell handover may be different. For another example, configuration information used by terminal devices that are of a same type and that currently perform different communication services may also be different. For example, a mobile phone currently uses data traffic, and another mobile phone currently does not use data traffic. In this case, configuration information may be different. However, trigger conditions, namely, first conditions, for different terminal devices to perform cell handover may be the same. Therefore, for the handover command, the first network device may send the handover command to each terminal device, where the handover command includes the configuration information. For the first condition, the first network device may broadcast the second message, where the second message includes the first condition, and the second message does not need to be individually sent to each terminal device, thereby reducing system overheads.

S403: The terminal device sends a reestablishment request message to the first network device or a second network device.

If a target cell to which the terminal device is to be handed over is similar to the foregoing first cell determined by the first network device, and if the first cell is a cell served by the first network device, the terminal device sends the reestablishment request message to the first network device. If the first cell is a cell served by the second network device, the terminal device sends the reestablishment request message to the second network device. In FIG. 4, an example in which the first cell is the cell served by the second network device is used.

A specific implementation of the reestablishment request message is similar to the specific implementation of the reestablishment request message in the embodiment in FIG. 3. For details, refer to the specific implementation of the foregoing reestablishment request message. Details are not described herein again.

S404: The second network device sends a radio resource control reconfiguration message to the terminal device.

The terminal device receives the radio resource control reconfiguration message, and may establish a connection to the first cell based on information, for example, a measurement configuration, mobility control information, and radio resource configuration dedicated information, that is carried in the radio resource control reconfiguration message, to complete the cell handover.

According to the method provided in this embodiment of this application, a network device may indicate the terminal device to perform, in advance, reestablishment in the first cell, so that the terminal device performs cell reestablishment without waiting for a radio link failure to occur on the terminal device, thereby reducing a data transmission interruption time period of the terminal device as much as possible.

The following describes, with reference to the accompanying drawings, apparatuses configured to implement the foregoing methods in the embodiments of this application. Therefore, all the foregoing content may be used in the following embodiments. Repeated content is not described again.

Figure 5:
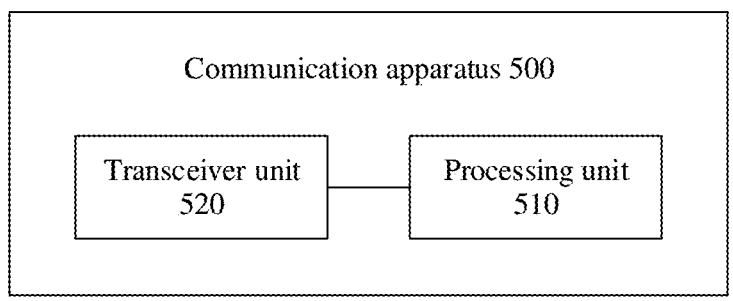
FIG. 5 is a schematic diagram of a structure of a communication apparatus according to an embodiment of this application.

FIG. 5 is a schematic block diagram of a communication apparatus 500 according to an embodiment of this application. For example, the communication apparatus 500 is a network device 500, or may be an element, a chip, an integrated circuit, or a function module in the network device. The communication apparatus 500 includes a processing unit 510 and a transceiver unit 520. The processing unit 510 may be configured to perform all operations, except receiving and sending operations, performed by the first network device in the embodiment shown in FIG. 3, for example, S301, and/or configured to support another process of the technology described in this specification. The transceiver unit 520 may be configured to perform all the receiving and sending operations performed by the first network device in the embodiment shown in FIG. 3, for example, S302 to S306, and/or configured to support another process of the technology described in this specification.

The processing unit 510 is configured to determine a first cell.

The transceiver unit 520 is configured to send a first message, where the first message includes an identifier of the first cell, and the identifier of the first cell is used to indicate a terminal device to perform cell reestablishment.

In a possible implementation, the transceiver unit 520 is specifically configured to send the first message in a broadcast manner.

In a possible implementation, the first message further includes a first condition, where the first condition is used to indicate the terminal device to perform cell reestablishment when the first condition is met, where the first condition includes one or any combination of the following:
  the first message is received by the terminal device;
  the terminal device is located in a first location; or
  a reference signal received power of the first cell is greater than a first threshold.

In a possible implementation, the transceiver unit 520 is further configured to: receive a reestablishment request message from the terminal device, where the reestablishment request message is used to request to perform cell reestablishment of the terminal device in the first cell.

The reestablishment request message includes a cause value, where the cause value is used to indicate that the cell reestablishment to be performed in the first cell is to be performed based on the first message.

In a possible implementation, the transceiver unit 520 is further configured to: send context information of the terminal device to a second network device, where the context information is used by the second network device to establish a connection to the terminal device, and the first cell is a cell served by the second network device.

It should be understood that the processing unit 510 in this embodiment of this application may be implemented by a processor or a processor-related circuit component, and the transceiver unit 520 may be implemented by a transceiver or a transceiver-related circuit component.

Figure 6:
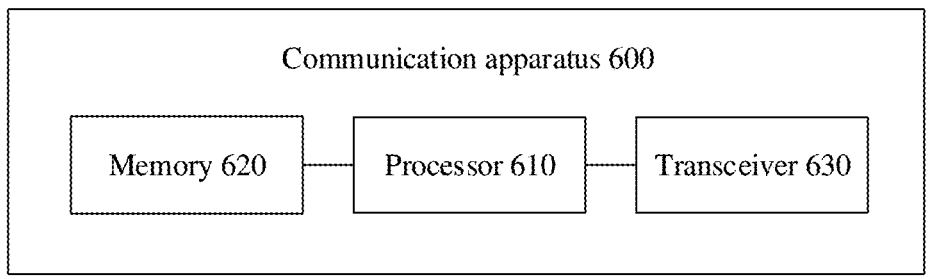
FIG. 6 is a schematic diagram of a structure of a communication apparatus according to an embodiment of this application.

As shown in FIG. 6, an embodiment of this application further provides a communication apparatus 600. For example, the communication apparatus 600 is a network device 600, or may be an element, a chip, an integrated circuit, or a function module in the network device. The communication apparatus 600 includes a processor 610, a memory 620, and a transceiver 630. The memory 620 stores instructions or a program. The processor 610 is configured to execute the instructions or the program stored in the memory 620. When the instructions or the program stored in the memory 620 are/is executed, the processor 610 is configured to perform an operation performed by the processing unit 510 in the foregoing embodiment, and the transceiver 630 is configured to perform an operation performed by the transceiver unit 520 in the foregoing embodiment.

It should be understood that the network device 600 or the network device 600 according to the embodiments of this application may correspond to the first network device in the embodiment shown in FIG. 3, and operations and/or functions of modules in the network device 600 or the network device 600 are separately used to implement corresponding procedures in the embodiment shown in FIG. 3. For brevity, details are not described herein again.

Figure 7:
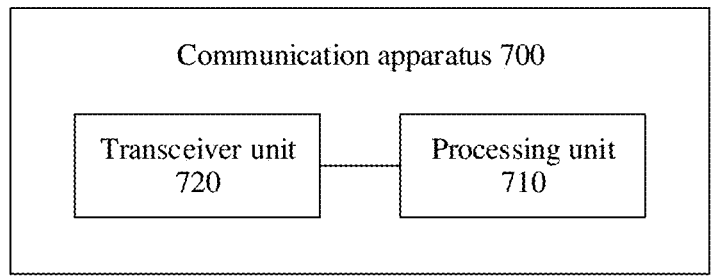
FIG. 7 is a schematic diagram of a structure of another communication apparatus according to an embodiment of this application.

FIG. 7 is a schematic block diagram of a communication apparatus 700 according to an embodiment of this application. For example, the communication apparatus 700 is a terminal device 700, or may be an element, a chip, an integrated circuit, or a function module in the terminal device. The communication apparatus includes a processing unit 710 and a transceiver unit 720. The processing unit 710 may control the terminal device to perform receiving and sending operations in the embodiment shown in FIG. 3, for example, S302, S303, and S308, and/or configured to support another process of the technology described in this specification.

The transceiver unit 720 is configured to receive a first message from a first network device, where the first message carries an identifier of a first cell. The processing unit 710 is configured to control, based on the identifier of the first cell, the transceiver unit 720 to send a reestablishment request message in the first cell.

In a possible implementation, the first message includes a first condition used to indicate the communication apparatus to send the reestablishment request message in the first cell when the first condition is met, where the first condition includes one or any combination of the following:
  the first message is received by the communication apparatus;
  the communication apparatus is located in a first location; or
  a reference signal received power of the first cell is greater than a first threshold.

In a possible implementation, the transceiver unit 720 is further configured to:
  send a second message to a second network device, where the second message is used to request to perform reestablishment in the first cell, the second message includes a cause value, and the cause value is used to indicate that cell reestablishment to be performed in the first cell is to be performed based on the first message.

It should be understood that the processing unit 710 in this embodiment of this application may be implemented by a processor or a processor-related circuit component, and the transceiver unit 720 may be implemented by a transceiver or a transceiver-related circuit component.

Figure 8:
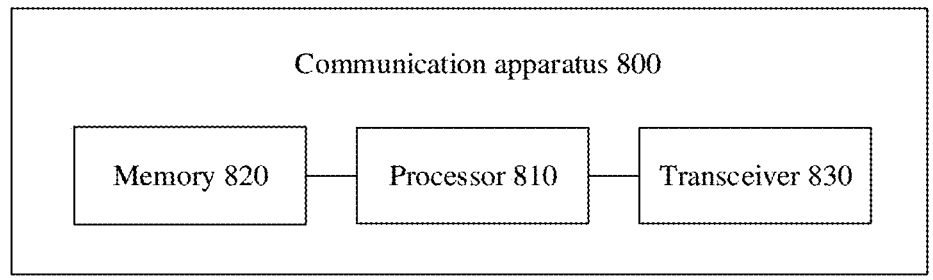
FIG. 8 is a schematic diagram of a structure of another communication apparatus according to an embodiment of this application.

As shown in FIG. 8, an embodiment of this application further provides a communication apparatus 800. For example, the communication apparatus 800 is a terminal device 800, or may be an element, a chip, an integrated circuit, or a function module in the terminal device. The communication apparatus includes a processor 810, a memory 820, and a transceiver 830. The memory 820 stores instructions or a program. The processor 810 is configured to execute the instructions or the program stored in the memory 820. When the instructions or the program stored in the memory 820 are/is executed, the processor 810 is configured to perform an operation performed by the processing unit 710 in the foregoing embodiment, and the transceiver 830 is configured to perform an operation performed by the transceiver unit 720 in the foregoing embodiment.

It should be understood that the terminal device 800 or the terminal device 800 according to the embodiments of this application may correspond to the terminal device in the embodiment shown in FIG. 3, and operations and/or functions of modules in the terminal device 800 or the terminal device 800 are separately used to implement corresponding procedures in the embodiment shown in FIG. 3. For brevity, details are not described herein again.

Figure 9:
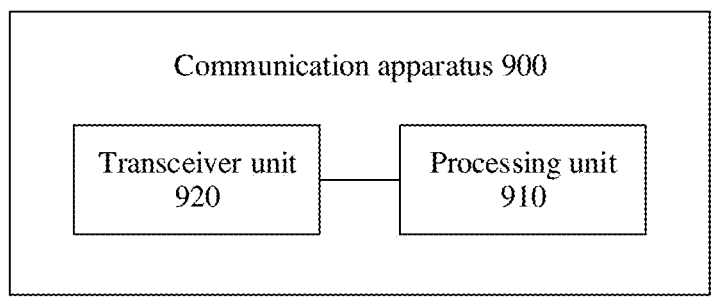
FIG. 9 is a schematic diagram of a structure of still another communication apparatus according to an embodiment of this application.

FIG. 9 is a schematic block diagram of a communication apparatus 900 according to an embodiment of this application. For example, the communication apparatus 900 is a network device 900, or may be an element, a chip, an integrated circuit, or a function module in the network device. The communication apparatus includes a processing unit 910 and a transceiver unit 920. The processing unit 910 may control the second network device in FIG. 3 to perform receiving and sending operations in the embodiment shown in FIG. 3, for example, S304 to S307, and/or configured to support another process of the technology described in this specification.

The transceiver unit 920 is configured to receive a reestablishment request message from a terminal device, where the reestablishment request message is used to request to perform cell reestablishment of the terminal device in a first cell, where the reestablishment request message includes a cause value, and the cause value is used to indicate that the cell reestablishment to be performed in the first cell is to be performed based on a first message sent by a first network device. The transceiver unit 920 is further configured to send a radio resource control reconfiguration message to the terminal device under control of the processing unit 910, where the radio resource control reconfiguration message is used by the terminal device to establish a connection to the first cell.

In a possible implementation, the transceiver unit 920 is further configured to receive context information of the terminal device from the first network device, where the context information is used by the second network device to establish a connection to the terminal device, and the first cell is a cell served by the second network device.

It should be understood that the processing unit 910 in this embodiment of this application may be implemented by a processor or a processor-related circuit component, and the transceiver unit 920 may be implemented by a transceiver or a transceiver-related circuit component.

Figure 10:
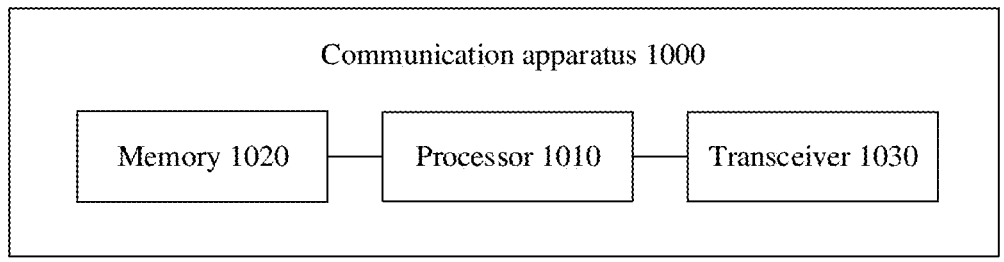
FIG. 10 is a schematic diagram of a structure of still another communication apparatus according to an embodiment of this application.

As shown in FIG. 10, an embodiment of this application further provides a communication apparatus 1000. For example, the communication apparatus 1000 is a network device 1000, or may be an element, a chip, an integrated circuit, or a function module in the network device. The communication apparatus includes a processor 1010, a memory 1020, and a transceiver 1030. The memory 1020 stores instructions or a program. The processor 1010 is configured to execute the instructions or the program stored in the memory 1020. When the instructions or the program stored in the memory 1020 are/is executed, the processor 1010 is configured to perform an operation performed by the processing unit 910 in the foregoing embodiment, and the transceiver 1030 is configured to perform an operation performed by the transceiver unit 920 in the foregoing embodiment.

It should be understood that the network device 1000 or the network device 1000 according to the embodiments of this application may correspond to the second network device in the embodiment shown in FIG. 3, and operations and/or functions of modules in the network device 1000 or the network device 1000 are separately used to implement corresponding procedures in the embodiment shown in FIG. 3. For brevity, details are not described herein again.

Figure 11:
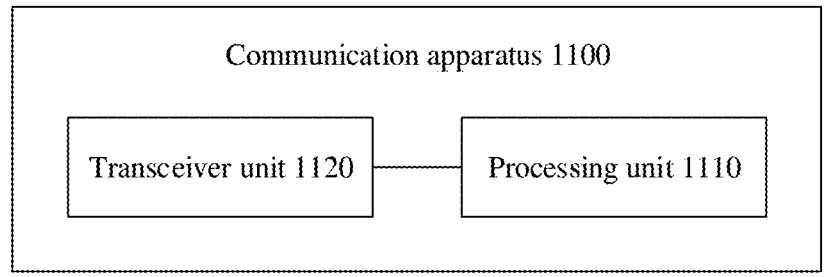
FIG. 11 is a schematic diagram of a structure of a communication apparatus according to an embodiment of this application.

FIG. 11 is a schematic diagram of a structure of a communication apparatus 1100. The communication apparatus 1100 may implement a function on a network device side in the methods provided in the embodiments of this application. The communication apparatus 1100 may alternatively be an apparatus that may support a network device to implement a function of the network device in the methods provided in the embodiments of this application. The communication apparatus 1100 may be a hardware structure, a software module, or a combination of a hardware structure and a software module. The communication apparatus 1100 may be implemented by a chip system. In this embodiment of this application, the chip system may include a chip, or may include a chip and another discrete component.

The communication apparatus 1100 may include a processing unit 1110 and a transceiver unit 1120.

The transceiver unit 1120 is used by the communication apparatus 1100 to communicate with another module, and may be a circuit, a component, an interface, a bus, a software module, a transceiver, or any other apparatus that can implement communication.

The transceiver unit 1120 may be configured to perform S401 and S402 in the embodiment shown in FIG. 4, and/or configured to support another process of the technology described in this specification. Alternatively, the transceiver unit 1120 may be configured to perform S403 and S404 in the embodiment shown in FIG. 4, and/or configured to support another process of the technology described in this specification.

The processing unit 1110 may be configured to control the transceiver unit 1120 to perform steps in the embodiment shown in FIG. 4 that are performed by the transceiver unit 1120, and/or configured to support another process of the technology described in this specification.

All related content of the steps in the foregoing method embodiments may be cited in function description of corresponding function modules. Details are not described herein again.

Figure 12:
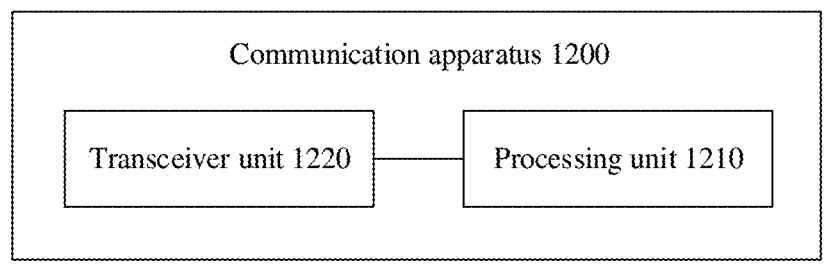
FIG. 12 is a schematic diagram of a structure of a communication apparatus according to an embodiment of this application.

FIG. 12 is a schematic diagram of a structure of a communication apparatus 1200. The communication apparatus 1200 may implement a function of the terminal device in the methods provided in the embodiments of this application. The communication apparatus 1200 may alternatively be an apparatus that may support a terminal device to implement a function on a terminal device side in the methods provided in the embodiments of this application. The communication apparatus 1200 may be a hardware structure, a software module, or a combination of a hardware structure and a software module. The communication apparatus 1200 may be implemented by a chip system. In this embodiment of this application, the chip system may include a chip, or may include a chip and another discrete component.

The communication apparatus 1200 may include a processing unit 1210 and a transceiver unit 1220.

The transceiver unit 1220 is used by the communication apparatus 1200 to communicate with another module, and may be a circuit, a component, an interface, a bus, a software module, a transceiver, or any other apparatus that can implement communication.

The transceiver unit 1220 may be configured to perform S401, S402, S403, and S404 in the embodiment shown in FIG. 4, and/or configured to support another process of the technology described in this specification.

The processing unit 1210 may be configured to control the transceiver unit 1220 to perform steps, for example, S401, S402, S403, and S404, in the embodiment shown in FIG. 4 that are performed by the transceiver unit 1220, and/or configured to support another process of the technology described in this specification.

All related content of the steps in the foregoing method embodiments may be cited in function description of corresponding function modules. Details are not described herein again.

Figure 13:
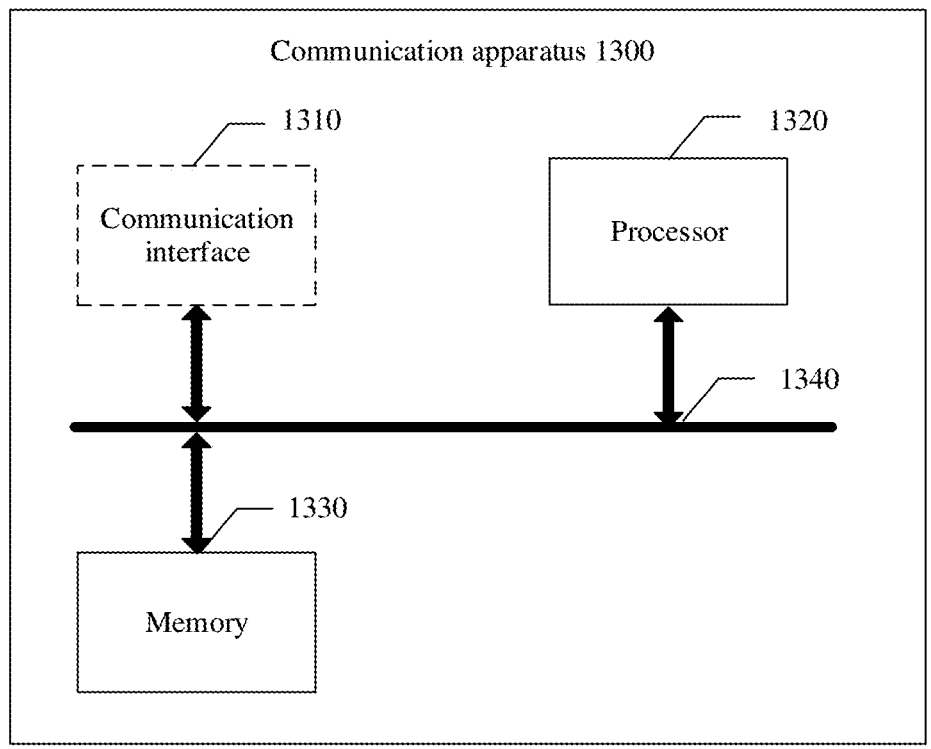
FIG. 13 is a schematic diagram of a structure of a communication apparatus according to an embodiment of this application.

FIG. 13 shows a communication apparatus 1300 according to an embodiment of this application. The communication apparatus 1300 may be a terminal device, and may implement a function of the terminal device in the methods provided in the embodiments of this application. Alternatively, the communication apparatus 1300 may be a network device, and may implement a function of the network device in the methods provided in the embodiments of this application. Alternatively, the communication apparatus 1300 may be an apparatus that may support a terminal device to implement a corresponding function in the methods provided in the embodiments of this application, or may be an apparatus that may support a network device to implement a corresponding function in the methods provided in the embodiments of this application. The communication apparatus 1300 may be a chip system. In this embodiment of this application, the chip system may include a chip, or may include a chip and another discrete component.

During hardware implementation, the transceiver unit 520, the transceiver unit 720, the transceiver unit 920, the transceiver unit 1120, or the transceiver unit 1220 may be a transceiver, and the transceiver is integrated into the communication apparatus 1300 to form a communication interface 1310.

The communication apparatus 1300 includes at least one processor 1320, configured to implement or support the communication apparatus 1300 to implement the function of the terminal device in the methods provided in the embodiments of this application. For example, the processor 1320 may determine a first cell. For details, refer to detailed description in the method examples. Details are not described herein again.

The communication apparatus 1300 may further include at least one memory 1330, configured to store program instructions and/or data. The memory 1330 is coupled to the processor 1320. Coupling in this embodiment of this application is indirect coupling or a communication connection between apparatuses, units, or modules, may be in an electrical, a mechanical, or another form, and is used for information exchange between the apparatuses, the units, or the modules. The processor 1320 may operate in collaboration with the memory 1330. The processor 1320 may execute the program instructions stored in the memory 1330. At least one of the at least one memory may be included in the processor.

The communication apparatus 1300 may further include the communication interface 1310 configured to communicate with another device through a transmission medium, so that an apparatus used in the communication apparatus 1300 may communicate with the another device. For example, when the communication apparatus is a terminal device, the another device is a network device. Alternatively, when the communication apparatus is a network device, the another device is a terminal device. The processor 1320 may send and receive data through the communication interface 1310. The communication interface 1310 may be specifically a transceiver.

In this embodiment of this application, a specific connection medium among the communication interface 1310, the processor 1320, and the memory 1330 is not limited. In this embodiment of this application, in FIG. 13, the memory 1330, the processor 1320, and the communication interface 1310 are connected through a bus 1340. The bus is represented by a bold line in FIG. 13. A connection manner between other components is merely an example for description, and is not limited thereto. The bus may be classified into an address bus, a data bus, a control bus, and the like. For ease of representation, only one thick line is used to represent the bus in FIG. 13, but this does not mean that there is only one bus or only one type of bus.

In this embodiment of this application, the processor 1320 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In this embodiment of this application, the memory 1330 may be a non-volatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store the program instructions and/or the data.

It should be noted that the communication apparatus in the foregoing embodiment may be a terminal device, a circuit, or a chip applied to the terminal device, or may be another combined component or component that has a function of the terminal device. When the communication apparatus is the terminal device, the transceiver unit may be a transceiver, and may include an antenna, a radio frequency circuit, and the like. The processing module may be a processor, for example, a central processing unit (CPU). When the communication apparatus is the component having the function of the terminal device, the transceiver unit may be a radio frequency unit, and the processing module may be the processor. When the communication apparatus is the chip system, the transceiver unit may be an input/output interface of the chip system, and the processing module may be a processor of the chip system.

Figure 14:
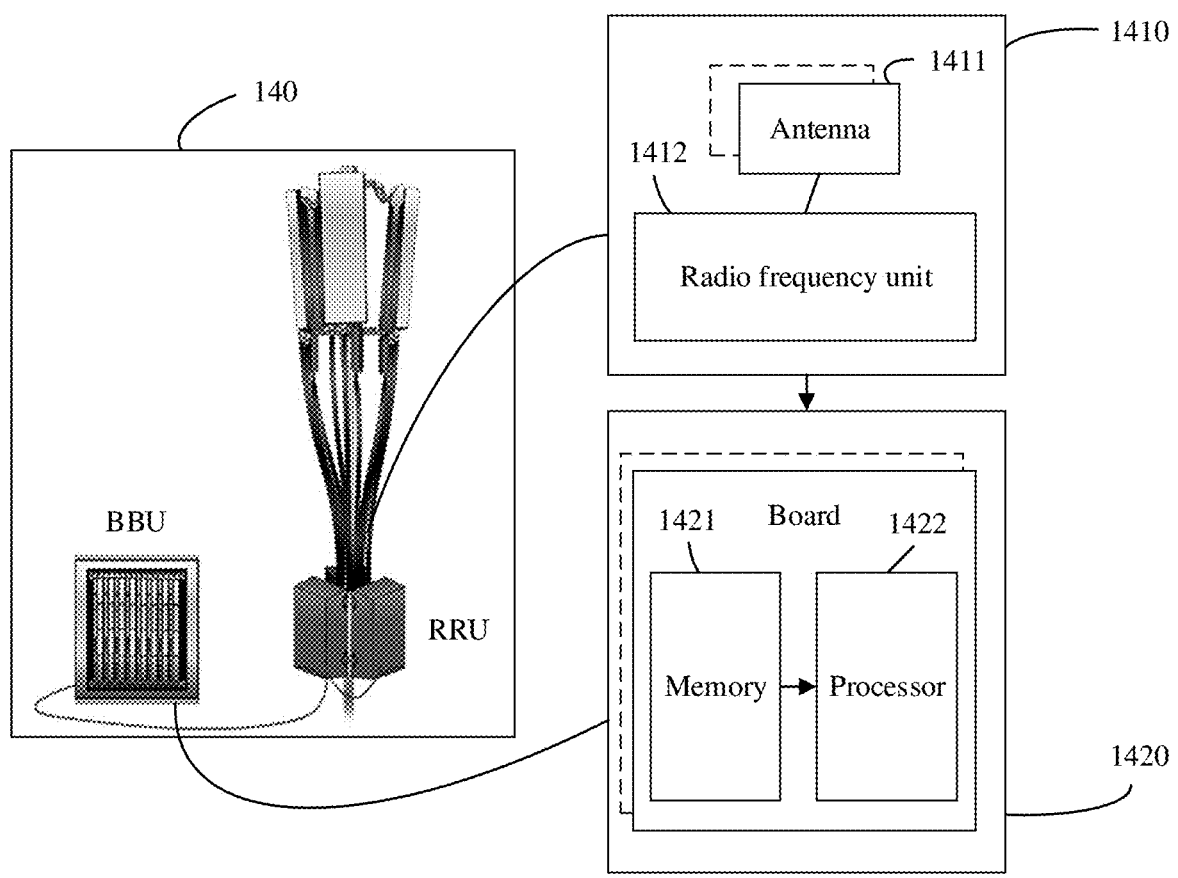
FIG. 14 is a schematic diagram of a structure of a communication apparatus according to an embodiment of this application.

FIG. 14 is a simplified schematic diagram of a structure of a communication apparatus. For ease of understanding and illustration, in FIG. 14, a network device is used as an example of the communication apparatus. A base station may be applied to the system shown in FIG. 2, may be the base station in FIG. 2, and performs a function of the first network device or the second network device in the foregoing method embodiments. A network device 140 may include one or more radio frequency units, such as a remote radio unit (RRU) 1410 and one or more baseband units (BBU) (which may also be referred to as digital units (DU)) 1420. The RRU 1410 may be referred to as a communication module, and corresponds to the transceiver unit 520 in FIG. 5, the transceiver unit 920 in FIG. 9, or the transceiver unit 1120 in FIG. 11. Optionally, the communication module may also be referred to as a transceiver, a transceiver circuit, a transceiver, or the like, and may include at least one antenna 1411 and a radio frequency unit 1412. The RRU 1410 is mainly configured to: receive and send a radio frequency signal, and perform conversion between the radio frequency signal and a baseband signal. For example, the RRU 1410 is configured to send indication information to a terminal device. The BBU 1420 is mainly configured to perform baseband processing, control the base station, and so on. The RRU 1410 and the BBU 1420 may be physically disposed together, or may be physically disposed separately, namely, in a distributed base station.

The BBU 1420 is a control center of the base station, and may also be referred to as a processing module. The BBU 1420 may correspond to the processing unit in FIG. 5, FIG. 9, or FIG. 11, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1420 may include one or more boards, and a plurality of boards may jointly support a radio access network (for example, an LTE network) of a single access standard, or may separately support radio access networks (for example, an LTE network, a 5G network, or another network) of different access standards. The BBU 1420 further includes a memory 1421 and a processor 1422. The memory 1421 is configured to store necessary instructions and data. The processor 1422 is configured to control the base station to perform a necessary action, for example, configured to control the base station to perform the operation procedure related to the network device in the foregoing method embodiments. The memory 1421 and the processor 1422 may serve the one or more boards. In other words, the memory and the processor may be disposed on each board. Alternatively, the plurality of boards may share a same memory and a same processor. In addition, a necessary circuit may be further disposed on each board.

Figure 15:
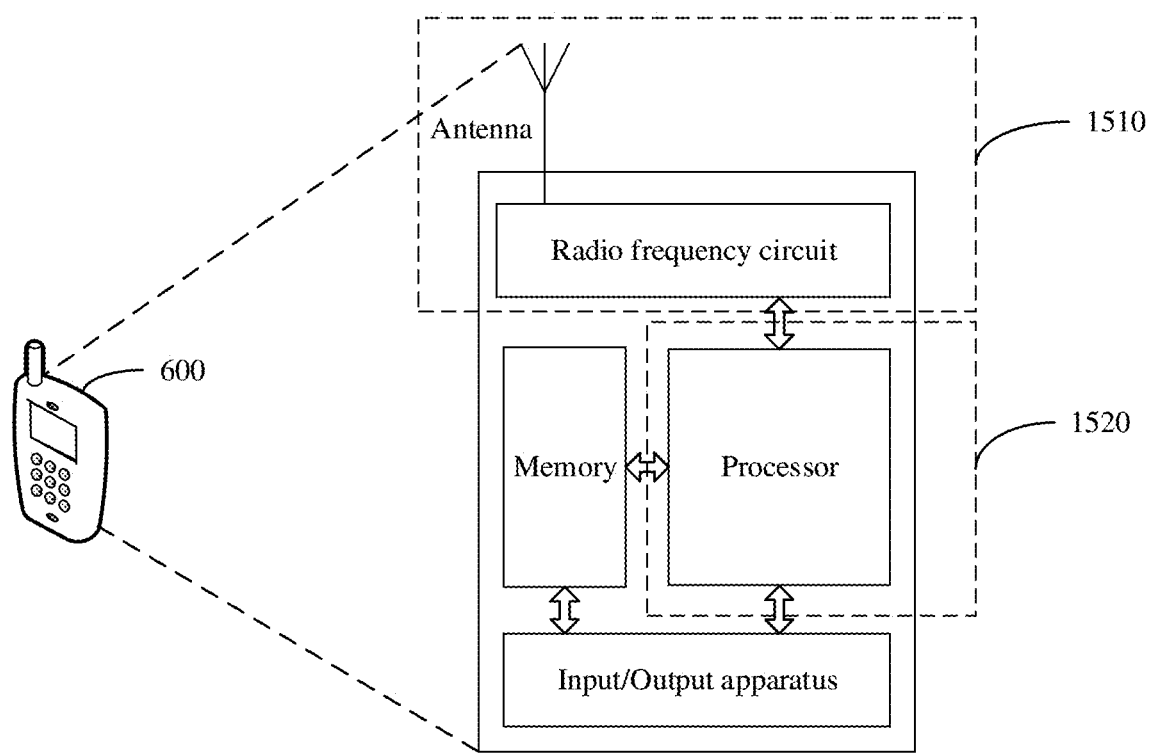
FIG. 15 is a schematic diagram of a structure of a communication apparatus according to an embodiment of this application.

FIG. 15 is a simplified schematic diagram of a structure of a communication apparatus. For ease of understanding and illustration, in FIG. 15, a mobile phone is used as an example of the communication apparatus. As shown in FIG. 15, a terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal and process the radio frequency signal. The antenna is mainly configured to send and receive the radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal, then sends a radio frequency signal to the outside in a form of an electromagnetic wave through the antenna. When data is sent to a terminal apparatus, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 15. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 15, the terminal device includes a transceiver unit 1510 and a processing unit 1520. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1510 and that is configured to implement the receiving function may be considered as a receiving unit, and a component that is in the transceiver unit 1510 and that is configured to implement the sending function may be considered as a sending unit. That is, the transceiver unit 1510 includes the receiving unit and the sending unit. The transceiver unit sometimes may also be referred to as a transceiver, a transceiver, a transceiver circuit, or the like. The receiving unit sometimes may also be referred to as a receiver, a receiver, a receiver circuit, or the like. The sending unit sometimes may also be referred to as a transmitter, a transmitter, a transmitter circuit, or the like.

It should be understood that the transceiver unit 1510 is configured to perform a sending operation and a receiving operation on a terminal device side in the foregoing method embodiments, and the processing unit 1520 is configured to perform an operation other than the receiving operation and the sending operation of the terminal device in the foregoing method embodiments.

For example, in an implementation, the transceiver unit 1510 may be configured to perform S302, S303, and S308 in the embodiment shown in FIG. 3, and/or configured to support another process of the technology described in this specification. Alternatively, the transceiver unit 1510 may be configured to perform S401, S402, S403, and S404 in the embodiment shown in FIG. 4, and/or configured to support another process of the technology described in this specification. The processing unit 1520 may be configured to control the transceiver unit 1510 to perform the steps performed by the transceiver unit 1510 in the embodiment shown in FIG. 3, and/or configured to support another process of the technology described in this specification. Alternatively, the processing unit 1520 may be configured to control the transceiver unit 1510 to perform the steps performed by the transceiver unit 1510 in the embodiment shown in FIG. 4, and/or configured to support another process of the technology described in this specification.

When a terminal apparatus is a chip, the chip includes a transceiver unit and a processing unit. The transceiver unit may be an input/output circuit or a communication interface. The processing unit is a processor, a microprocessor, or an integrated circuit integrated on the chip.

Figure 16:
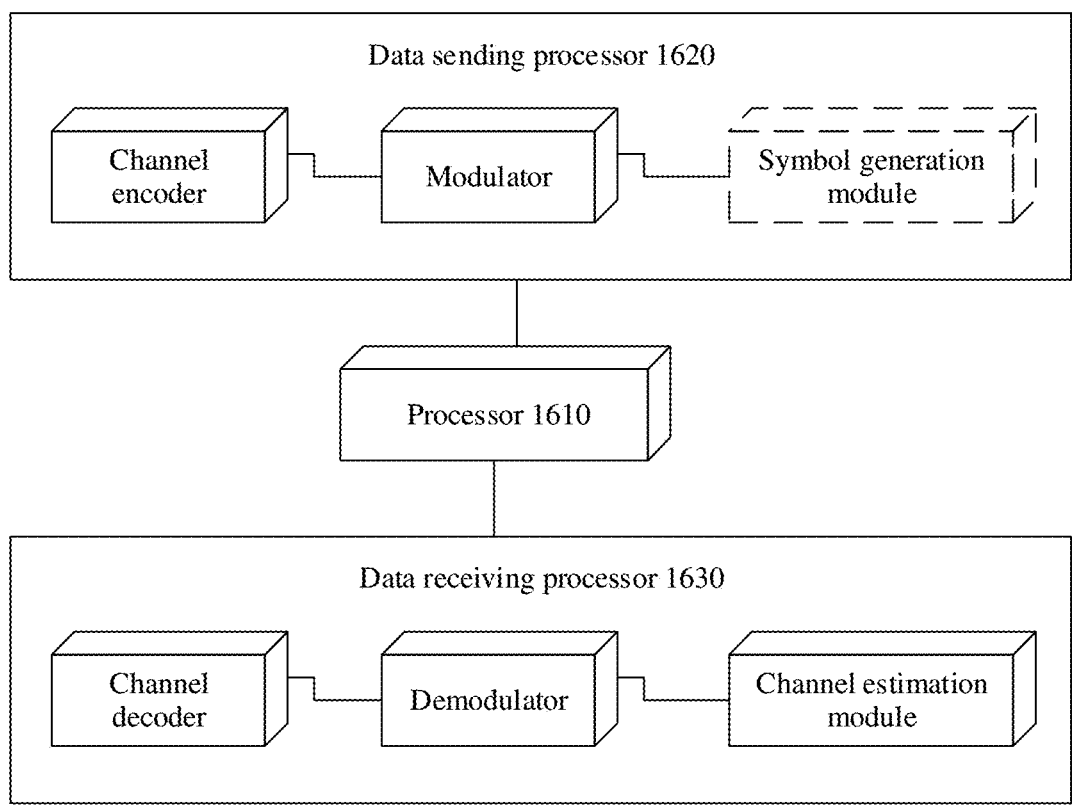
FIG. 16 is a schematic diagram of a structure of a communication apparatus according to an embodiment of this application.

In this embodiment, refer to a device shown in FIG. 16. In an example, the device may implement a function similar to that of the processing unit 1520 in FIG. 15. In FIG. 16, the device includes a processor 1610, a data sending processor 1620, and a data receiving processor 1630. The processor 1610 in FIG. 16 may be the processing unit 710 or the processing unit 1210 in the foregoing embodiments, and implements a corresponding function. The data sending processor 1620 and/or the data receiving processor 1630 in FIG. 16 may be the processing unit 710 or the processing unit 1210 in the foregoing embodiments. Although FIG. 16 shows a channel encoder and a channel decoder, it may be understood that the modules are merely examples, and do not constitute a limitation on this embodiment.

Figure 17:
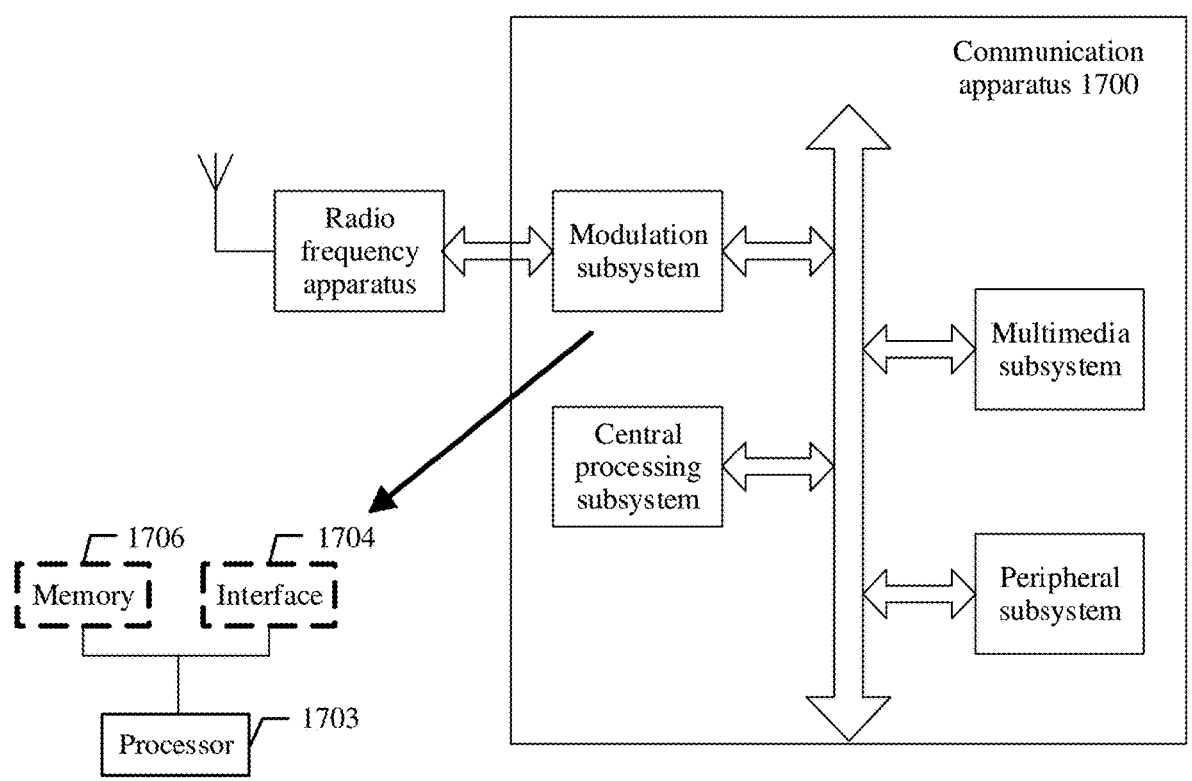
FIG. 17 is a schematic diagram of a structure of a communication apparatus according to an embodiment of this application.

FIG. 17 shows another form of this embodiment. A terminal device 1700 includes modules such as a modulation subsystem, a central processing subsystem, and a peripheral subsystem. The terminal device in this embodiment may be used as the modulation subsystem in the terminal device 1700. Specifically, the modulation subsystem may include a processor 1703 and an interface 1704. The processor 1703 completes a function of the processing unit 710 or the processing unit 1210, and the interface 1704 completes a function of the transceiver unit 720 or the transceiver unit 1220. In another variation, the modulation subsystem includes a memory 1706, the processor 1703, and a program that is stored in the memory 1706 and that can be run on the processor. When executing the program, the processor 1703 implements the method of the first terminal apparatus or the second terminal apparatus in the foregoing method embodiments. It should be noted that the memory 1706 may be non-volatile, or may be volatile. The memory 1706 may be located in the modulation subsystem, or may be located in the processing apparatus 1700, provided that the memory 1706 can be connected to the processor 1703.

An embodiment of this application further provides a communication system. Specifically, the communication system includes a terminal device and a network device, or may further include more terminal devices and network devices, or may further include a plurality of terminal devices and a plurality of network devices, or may further include a satellite station.

The terminal device and the network device are respectively configured to implement functions of related devices in FIG. 3 or FIG. 4. For details, refer to related description in the method embodiments. Details are not described herein again.

An embodiment of this application further provides a computer-readable storage medium, including instructions. When the instructions are run on a computer, the computer is enabled to perform the method performed by the terminal device and the network device in FIG. 3 or FIG. 4.

An embodiment of this application further provides a computer program product, including instructions. When the instructions are run on a computer, the computer is enabled to perform the method performed by the terminal device and the network device in FIG. 3 or FIG. 4.

An embodiment of this application provides a chip system. The chip system includes a processor, may further include a memory, and is configured to implement a function of the terminal device or the network device in the foregoing methods. The chip system may include a chip, or may include a chip and another discrete component.

Obviously, a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A method, comprising:
   determining, by a first network device, a first cell;
   sending, by the first network device, a first message, wherein the first message comprises an identifier of the first cell, and the identifier of the first cell indicates to a terminal device to perform cell reestablishment of the terminal device in the first cell; and
   receiving, by the first network device, a reestablishment request message from the terminal device, wherein the reestablishment request message is used to request to perform cell reestablishment of the terminal device in the first cell, wherein the reestablishment request message comprises a cause value that is used to indicate that the cell reestablishment to be performed in the first cell is to be performed based on the first message.

2. The method according to claim 1, wherein the first message is sent in a broadcast manner.

3. The method according to claim 1, wherein the first message further comprises a first condition, wherein the first condition indicates to the terminal device to perform cell reestablishment when the first condition is met, and wherein the first condition comprises that:
   the first message is received by the terminal device.

4. The method according to claim 1, wherein the first message further comprises a first condition, wherein the first condition indicates to the terminal device to perform cell reestablishment when the first condition is met, and wherein the first condition comprises that the terminal device is located in a first location.

5. The method according to claim 1, wherein the first message further comprises a first condition, wherein the first condition indicates to the terminal device to perform cell reestablishment when the first condition is met, and wherein the first condition comprises that a reference signal received power of the first cell is greater than a first threshold.

6. The method according to claim 1, further comprising:
   sending, by the first network device, context information of the terminal device to a second network device, wherein the context information is used by the second network device to establish a connection to the terminal device, and the first cell is a cell served by the second network device.

7. The method according to claim 1, wherein the first network device is deployed on a satellite.

8. The method of claim 1, wherein performing the cell reestablishment of the terminal device in the first cell comprises the terminal device establishing a connection to the first cell for the first time.

9. The method of claim 1, wherein performing the cell reestablishment of the terminal device in the first cell comprises the terminal device establishing a connection to the first cell after a cell handover failure.

10. An apparatus, comprising:
    at least one processor; and
    a non-transitory computer readable storage medium storing a program that is executable by the at least one processor; the program including instructions to:
      receive a first message from a first network device, wherein the first message carries an identifier of a first cell,
      send a reestablishment request message in the first cell based on the identifier of the first cell, wherein the reestablishment request message is used to request to perform cell reestablishment of the apparatus in the first cell, and send a second message to a second network device, wherein the second message is used to request to perform reestablishment in the first cell, the second message comprises a cause value, and the cause value is used to indicate that cell reestablishment to be performed in the first cell is to be performed based on the first message.

11. The apparatus according to claim 10, wherein the first message comprises a first condition that indicates to the apparatus to send the reestablishment request message in the first cell when the first condition is met, wherein the first condition comprises one or more of or any combination of the following:
the first message is received by the apparatus;
the apparatus is located in a first location; or
a reference signal received power of the first cell is greater than a first threshold.

12. The apparatus according to claim 10, wherein performing the cell reestablishment of the apparatus in the first cell includes the apparatus establishing a connection to the first cell for the first time, or the apparatus establishing a connection to the first cell after a cell handover failure.

13. An apparatus, comprising:
at least one processor; and
a non-transitory computer readable storage medium storing a program executable by the at least one processor, the program including instructions to:
determine a first cell,
send a first message, wherein the first message comprises an identifier of the first cell, and the identifier of the first cell indicates to a terminal device to perform cell reestablishment of the terminal device in the first cell, and
receive a reestablishment request message from the terminal device, wherein the reestablishment request message is used to request to perform cell reestablishment of the terminal device in the first cell, wherein the reestablishment request message comprises a cause value that is used to indicate that the cell reestablishment to be performed in the first cell is to be performed based on the first message.

14. The apparatus according to claim 13, wherein the program includes instructions to send the first message in a broadcast manner.

15. The apparatus according to claim 13, wherein the first message further comprises a first condition, wherein the first condition indicates to the terminal device to perform cell reestablishment when the first condition is met, and wherein the first condition comprises that the first message is received by the terminal device.

16. The apparatus according to claim 13, wherein the first message further comprises a first condition, wherein the first condition indicates to the terminal device to perform cell reestablishment when the first condition is met, and wherein the first condition comprises that the terminal device is located in a first location.

17. The apparatus according to claim 13, wherein the first message further comprises a first condition, wherein the first condition indicates to the terminal device to perform cell reestablishment when the first condition is met, and wherein the first condition comprises that a reference signal received power of the first cell is greater than a first threshold.

18. The apparatus according to claim 13, wherein the program further includes instructions to:
send context information of the terminal device to a second network device, wherein the context information is used by the second network device to establish a connection to the terminal device, and the first cell is a cell served by the second network device.

19. The apparatus according to claim 13, wherein the apparatus is deployed on a satellite.

20. The apparatus according to claim 13, wherein performing the cell reestablishment of the terminal device in the first cell comprises a terminal device establishing a connection to the first cell for the first time, or the terminal device establishing a connection to the first cell after a cell handover failure.

* * * * *

UNITED STATES PATENT AND TRADEMARK OFFICE
CERTIFICATE OF CORRECTION

PATENT NO. : 12,225,416 B2  
APPLICATION NO. : 17/652540  
DATED : February 11, 2025  
INVENTOR(S) : Chen et al.

Page 1 of 1

It is certified that error appears in the above-identified patent and that said Letters Patent is hereby corrected as shown below:

In the Claims

In Column 36, in Claim 10, Line 59, delete "processor;" and insert -- processor, --.

In Column 38, in Claim 20, Line 35, after "comprises" delete "a" and insert -- the --.

Signed and Sealed this  
Twenty-second Day of April, 2025

Coke Morgan Stewart  
*Acting Director of the United States Patent and Trademark Office*